(12) United States Patent
Becker et al.

(10) Patent No.: US 9,745,414 B2
(45) Date of Patent: Aug. 29, 2017

(54) HYPERBRANCHED AMINO ACID-BASED POLY(ESTER UREA)S FOR REGENERATIVE MEDICINE AND DRUG DELIVERY

(71) Applicants: Matthew Becker, Stow, OH (US); Jiayi Yu, Cuyahoga Falls, OH (US)

(72) Inventors: Matthew Becker, Stow, OH (US); Jiayi Yu, Cuyahoga Falls, OH (US)

( * ) Notice: Subject to any disclaimer, the term of this patent is extended or adjusted under 35 U.S.C. 154(b) by 0 days.

(21) Appl. No.: 14/939,216

(22) Filed: Nov. 12, 2015

(65) Prior Publication Data

US 2016/0130390 A1      May 12, 2016

Related U.S. Application Data

(60) Provisional application No. 62/078,507, filed on Nov. 12, 2014.

(51) Int. Cl.
*C08G 63/685*      (2006.01)

(52) U.S. Cl.
CPC ................... *C08G 63/685* (2013.01)

(58) Field of Classification Search
CPC ........ A61K 47/34; C08G 63/685; C08L 75/04
See application file for complete search history.

(56) References Cited

PUBLICATIONS

Lin et al "Postelectrospinning "Click" Modification of Degradable Amino Acid-Based Poly(ester urea) Nanofibers", Macromolecules 2013, 46, 9515-9525, published on Dec. 2, 2013.*
Pang et al "Synthesis, characterization and biodegradation of functionalized amino acid-based poly(ester amide)s", Biomaterials 31 (2010) 3745-3754, published online Feb. 19, 2010.*

\* cited by examiner

*Primary Examiner* — Gregory Listvoyb
(74) *Attorney, Agent, or Firm* — Renner Kenner Greive Bobak Taylor & Weber

(57) ABSTRACT

One or more embodiments of the present invention provide a hyperbranched amino-acid-based PEU polymer for use in regenerative medicine and/or drug delivery applications has tunable mechanical and thermal properties, but is sufficiently stable to permit such things as ethyloxide sterilization without degradation and/or significant loss of function. These hyperbranched amino acid-based poly(ester urea) (PEU) by interfacial polycondensation between linear and branched amino acid-based polyester monomers and a urea forming material such as trisphosgene or phosgene. By controlling the amount of branched monomer incorporated into the copolymer, the mechanical properties and water uptake abilities of the resulting hyperbranched amino acid-based PEUs may be tuned. The hyperbranched PEUs nanofibers are sterilizable with ETO and are stable for long periods of ETO sterilization, elevated temperature and exposure to aqueous environments. In various embodiments, these hyperbranched amino acid-based PEUs are also biodegradable and can be formed into fibers.

16 Claims, 15 Drawing Sheets r. t.
dry r. t.
wet r. t.
dry & sterilized r. t.
wet & sterilized

37 °C dry | wet

37 °C

37 °C dry
&
sterilized

37 °C wet
&
sterilized

45 °C dry

45 °C wet

45 °C dry
&
sterilized

45 °C wet
&
sterilized

HYPERBRANCHED AMINO ACID-BASED POLY(ESTER UREA)S FOR REGENERATIVE MEDICINE AND DRUG DELIVERY

CROSS REFERENCE TO RELATED APPLICATIONS

This application claims the benefit of U.S. provisional patent application Ser. No. 62/078,507 entitled "Hyperbranched Amino Acid-Based Poly(ester ureas) For Regenerative Medicine and Drug Delivery," filed Nov. 12, 2014 and incorporated herein by reference in its entirety.

FIELD OF THE INVENTION

One or more embodiments of the present invention relate to a poly(ester urea) (PEU) polymers for use in regenerative medicine and/or drug delivery. In certain embodiments, the present invention relates to a hyperbranched amino-acid-based PEU polymer having tunable mechanical and thermal properties, that is sufficiently stable to permit such things as ethyloxide sterilization without degradation and/or significant loss of function.

BACKGROUND OF THE INVENTION

Macromolecular architecture has been recognized as an important tool to obtain polymers with tailored properties. Materials exhibiting a distinct relationship between molecular architecture and macroscopic properties include dendrimers and hyperbranched polymers and it is known that introducing branching units into linear polymers can dramatically change their physical properties. Dendrimers and hyperbranched polymers possess unique three-dimensional chemical structures and have many potential applications in such things as coatings, additives, catalysts, drug delivery systems, and bioimaging systems. Unlike linear polymers, dendrimers and hyperbranched polymers exhibit unique properties including non/low chain entanglements, low viscosity, high solubility, unusual self-assembly behaviors, a large number of terminal groups that can be chemically modified, and a large capacity of encapsulation for guest molecules. Despite the well-defined monodisperse architecture of dendrimers, scalability challenges have limited their widespread clinical and commercial applications. In contrast, hyperbranched polymers can be conveniently synthesized on a large scale in one-pot reactions using step growth or ring opening polymerization and require little or no additional purification. Hyperbranched polymers not only retain some of the structural features and properties of dendrimers, they are more commercially accessible.

Efforts have been made to diversify the pool of synthetic polymers to find those that meet design criteria for more advanced applications. Hyperbranched polymers, especially synthetic biodegradable hyperbranched polymers, have been receiving more and more attention in materials science as well as in biomedical science, and include hyperbranched polyethers, polyesters, polyphosphates, and polysaccharides. Over the last fifteen years or so, for example, synthesis of hyperbranched aliphatic polyethers, (poly(3-ethyl-3-oxetanemethanol)) by a cationic ring-opening polymerization; a hyperbranched polyglycerol obtained by anionic ring opening multi-branching polymerization; synthesis of potentially biodegradable homo- and co-polyesters of gallic acid, phloretic acid and vanillic acid; synthesis of hyperbranched poly(ester amide)s via direct polycondensation from commercially available aliphatic carboxylic anhydrides and multihydroxyl primary amines; and synthesis of hyperbranched polyphosphates using self-condensing ring opening polymerization of cyclic phosphate monomers 2-(2-hydroxyethoxy)ethoxy-2-oxo-1,3,2-dioxaphospholane without catalyst, have all been reported. All of these hyperbranched polymers have shown potential for the self-assembly of micelles and biomedical applications.

α-Amino acid-based poly(ester urea)s have proven to be important materials for biomedical applications because of their excellent blood, tissue compatibility and non-toxic hydrolysis byproducts. Their semi-crystalline structure provides a non-chemical method to enhance their mechanical properties and processing characteristics. Also, their synthetic flexibility yields a diverse physical and chemical landscape that is available for exploration. The synthesis of a 1,6-hexanediol L-phenylalanine-based PEU, poly(1-PHE-6) that possesses an elastic modulus (6.1 GPa) nearly double that of poly(lactic acid) (2.9 GPa) and when crosslinked with osteogenic growth peptide maintains potent osteoinductive activity, has been previously demonstrated. See, e.g., Kasuga, T.; Ota, Y.; Nogami, M.; Abe, Y. *Biomaterials* 2000, 22, 19 and Stakleff, K. S.; Lin, F.; Smith Callahan, L. A.; Wade, M. B.; Esterle, A.; Miller, J.; Graham, M.; Becker, M. L. *Acta Biomaterialia* 2013, 9, 5132, the disclosure of which are encorporated herein by reference in their entirety. Significantly, there has been no evidence of inflammation due to degradation related acidification when poly(1-PHE-6) has been implanted in vivo. A series of linear L-phenylalanine-based PEU that possess variations in diol chain length that result in tunable mechanical properties, thermal characteristics and degradation rates have also been developed. See, e.g., Yu, J.; Lin, F.; Lin, P.; Gao, Y.; Becker, M. L. *Macromolecules* 2014, 47, 121, the disclosure of which is encorporated herein by reference in its entirety. The mechanical data span a range of values that overlaps with several currently clinically available degradable polymers and the materials exhibited a diol length dependent degradation process that is tunable. In addition, the synthesis of PEU nanofibers carrying pendent "clickable" groups including alkyne, azide, alkene, tyrosine-phenol and ketone groups on modified tyrosine amino acids have been reported. See, e.g., Lin, F.; Yu, J.; Tang, W.; Zheng, J.; Xie, S.; Becker, M. L. *Macromolecules* 2013, 46, 9515, the disclosure of which is encorporated herein by reference in its entirety.

It has been found, however, that these PEU polymers lacked the stability necessary for sterilization, limiting their use for use in vivo for regenerative medicine and/or drug delivery. What is needed in the art is a degradable amino-acid-based PEU polymer for use in regenerative medicine and/or drug delivery applications has tunable mechanical and thermal properties, but is sufficiently stable to permit such things as ethyloxide (ETO) sterilization without degradation and/or significant loss of function.

SUMMARY OF THE INVENTION

One or more embodiments of the present invention provide a hyperbranched amino-acid-based PEU polymer for use in regenerative medicine and/or drug delivery applications has tunable mechanical and thermal properties, but is sufficiently stable to permit such things as ethyloxide sterilization without degradation and/or significant loss of function.

In a first aspect, the present invention is directed to a hyperbranched amino acid-based poly(ester urea) comprising: a plurality of first segments containing a linear amino acid-based diester monomer residue, said linear amino acid-based diester monomer residue comprising two or more amino acid residues; and a plurality of second segments containing a branched amino acid-based polyester monomer residue, said branched amino acid-based polyester monomer residue comprising three or more amino acid residues. In some embodiments of this aspect of the present invention, the said linear amino acid-based diester monomer residue comprises two amino acid residues separated by from about 2 to about 20 carbon atoms.

In one or more embodiments, the hyperbranched amino acid-based poly(ester urea) of the present invention includes any one or more of the above referenced embodiments of the first aspect of the present invention wherein, said two or more amino acid residues are residues of phenylalanine, alanine, arginine, asparagine, aspartate, cysteine, glutamic acid, glutamine, glycine, proline, serine, tyrosine; isoleucine, leucine, lysine, methionine, phenylalanine, threonine, tryptophan and valine or combinations thereof. In one or more embodiments, the hyperbranched amino acid-based poly(ester urea) of the present invention includes any one or more of the above referenced embodiments of the first aspect of the present invention wherein, said branched amino acid-based polyester monomer residue further comprises three or more amino acid residues separated from each other by from about 2 to about 60 carbon atoms. In one or more embodiments, the hyperbranched amino acid-based poly(ester urea) of the present invention includes any one or more of the above referenced embodiments of the first aspect of the present invention wherein, the branched amino acid-based polyester monomer residue are from about 0.5 mole percent to about 20 mole percent of said hyperbranched amino acid-based poly(ester urea).

In one or more embodiments, the hyperbranched amino acid-based poly(ester urea) of the present invention includes any one or more of the above referenced embodiments of the first aspect of the present invention having a weight average molecular weight ($M_w$) of from about 10,000 to about 500,000. In one or more embodiments, the hyperbranched amino acid-based poly(ester urea) of the present invention includes any one or more of the above referenced embodiments of the first aspect of the present invention having a number average molecular weight ($M_n$) of from about 10,000 to about 250,000. In one or more embodiments, the hyperbranched amino acid-based poly(ester urea) of the present invention includes any one or more of the above referenced embodiments of the first aspect of the present invention having a polydispersity index of ($Đ_m$) of from about 2.0 to about 10.0.

In one or more embodiments, the hyperbranched amino acid-based poly(ester urea) of the present invention includes any one or more of the above referenced embodiments of the first aspect of the present invention having a glass transition temperature ($T_g$) of from about 40° C. to about 40° C. In one or more embodiments, the hyperbranched amino acid-based poly(ester urea) of the present invention includes any one or more of the above referenced embodiments of the first aspect of the present invention having an onset degradation temperature ($T_d$) of from about 270° C. to about 320° C. In one or more embodiments, the hyperbranched amino acid-based poly(ester urea) of the present invention includes any one or more of the above referenced embodiments of the first aspect of the present invention having an elastic modulus of from about 0.1 MPa to about 3.0 GPa at room temperature. In one or more embodiments, the hyperbranched amino acid-based poly(ester urea) of the present invention includes any one or more of the above referenced embodiments of the first aspect of the present invention having improved hydrolytic stability when compared to a corresponding PEU polymer that does not contain said plurality of second segments.

In a second aspect, the present invention is directed to a hyperbranched amino acid-based poly(ester urea) comprising the reaction product of: a protected linear diester monomer containing two or more amino acid residues; and a protected branched polyester monomer containing three or more amino acid residues. In some embodiments of this aspect of the present invention, the protected linear diester monomer comprises the di-p-toluene sulfonic salt, hydrochloric acid salt of a linear diester monomer having two amino acid residues separated from about 2 to about 20 carbon atoms.

In one or more embodiments, the hyperbranched amino acid-based poly(ester urea) of the present invention includes any one or more of the above referenced embodiments of the first or second aspect of the present invention wherein, the two or more amino acid residues of said protected linear diester monomer are residues of phenylalanine, alanine, arginine, asparagine, aspartate, cysteine, glutamic acid, glutamine, glycine, proline, serine, tyrosine; isoleucine, leucine, lysine, methionine, phenylalanine, threonine, tryptophan and valine, and/or combinations thereof. In one or more embodiments, the hyperbranched amino acid-based poly(ester urea) of the present invention includes any one or more of the above referenced embodiments of the first or second aspect of the present invention wherein, said protected linear diester monomer is selected from the group consisting of the di-p-toluene sulfonic acid salt of bis-L-phenylalanine-hexane-1,6-diester monomer, di-p-toluenesulfonic acid salt of bis-L-phenylalanine-octane-1,8-diester, di-hydrochloric acid salt of bis-O-benzyl-L-tyrosine-octane-1,8-diester, and combinations thereof. In one or more embodiments, the hyperbranched amino acid-based poly(ester urea) of the present invention includes any one or more of the above referenced embodiments of the first or second aspect of the present invention wherein, said protected branched polyester monomer comprises the hydrochloric acid salt of a branched polyester monomer having three or more amino acid residues, said three or more amino acid residues separated from each other by from about 2 to about 20 carbon atoms.

In one or more embodiments, the hyperbranched amino acid-based poly(ester urea) of the present invention includes any one or more of the above referenced embodiments of the first or second aspect of the present invention wherein, the three or more amino acid residues of said protected branched polyester monomer are residues of phenylalanine, alanine, arginine, asparagine, aspartate, cysteine, glutamic acid, glutamine, glycine, proline, serine, tyrosine; isoleucine, lysine, methionine, phenylalanine, threonine, tryptophan and valine and/or combinations thereof. In one or more embodiments, the hyperbranched amino acid-based poly(ester urea) of the present invention includes any one or more of the above referenced embodiments of the first or second aspect of the present invention wherein, said protected branched polyester monomer is a hydrochloric acid salt of tri-o-benzyl-L-tyrosine-1,1,1-trimethyl ethane-triester. In one or more embodiments, the hyperbranched amino acid-based poly(ester urea) of the present invention includes any one or more of the above referenced embodiments of the first or second aspect of the present invention wherein, said protected branched polyester monomer is an L amino acid-1,1,1-trimethyl ethane triester, wherein the amino acid is selected from the group consisting of phenylalanine, alanine, arginine, asparagine, aspartate, cysteine, glutamic acid, glutamine, glycine, proline, serine, tyrosine; isoleucine, leucine, lysine, methionine, phenylalanine, threonine, tryptophan and valine and/or combinations thereof.

In a third aspect, the present invention is directed to a fiber comprising the hyperbranched amino acid-based poly(ester urea) of the first and/or second aspects of the present invention. In some embodiments, the fiber is formed by a process selected from the group consisting of electrospinning, melt blowing, blow spinning, centrifugal spinning, Rotary Jet Spinning (RJS), Gas Jet Fibers (GJF), Nanofibers by Gas Jet (NGJ), three-dimensional printing, extrusion, and combinations thereof. In one or more embodiments, the fiber comprising the hyperbranched amino acid-based poly(ester urea) of the present invention includes any one or more of the above referenced embodiments of the third aspect of the present invention wherein said fiber is formed by electrospinning. In one or more embodiments, the fiber comprising the hyperbranched amino acid-based poly(ester urea) of the present invention includes any one or more of the above referenced embodiments of the third aspect of the present invention wherein said fiber is a nanofiber or microfiber. In one or more embodiments, the fiber comprising the hyperbranched amino acid-based poly(ester urea) of the present invention includes any one or more of the above referenced embodiments of the third aspect of the present invention wherein said fiber can be sterilized using ethyloxide (ETO) sterilization without significant degradation or loss of function.

BRIEF DESCRIPTION OF THE DRAWINGS

For a more complete understanding of the features and advantages of the present invention, reference is now made to the detailed description of the invention along with the accompanying figures in which:

(FIG. 15A), after soaking in DI water for 60 h at 37° C. (FIG. 15B), dry and ETO sterilized at 37° C. (FIG. 15C), and ETO sterilized and soaked in DI water for 60 hours at 37° C. (FIG. 15D). The SEM images confirmed that the morphology of the fibers did not change after soaking in DI water for 60 h and even after ETO sterilization at 37° C.

(FIG. 16A), after soaking in DI water for 1 week at 45° C. (FIG. 16B), dry and ETO sterilized at 45° C. (FIG. 16C), and ETO sterilized and soaked in DI water for 1 week at 45° C. (FIG. 16D). The SEM images confirmed that when the incubation temperature was increased to 45° C. and the incubation time became longer (1 week), the fibers stayed as fibers when they were dry, but appeared to swell and stick to each other when soaked in DI water (FIG. 16A-D).

DETAILED DESCRIPTION OF THE ILLUSTRATIVE EMBODIMENTS

Figure 1A:
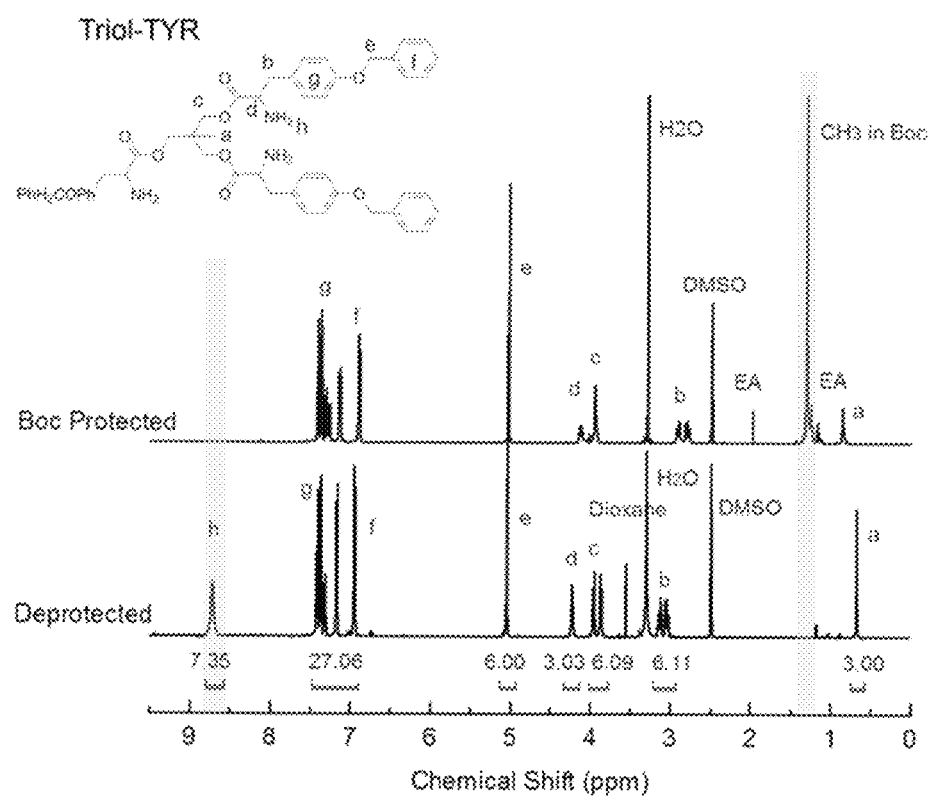
FIG. 1A-B are Proton Nuclear Magnetic Resonance Spectroscopy ($^1$H NMR) (DMSO-d6) spectra of di-p-toluene sulfonic acid salts of bis-L-phenylalanine-hexane-1,6-diester monomer (Diol-PHE) (FIG. 1A) and hydrochloric acid salts of tri-O-benzyl-L-tyrosine-1,1,1-trimethyl ethane-triester monomer (Triol-TYR) (FIG. 1B).

One or more embodiments of the present invention provide a hyperbranched amino-acid-based PEU polymer for use in regenerative medicine and/or drug delivery applications has tunable mechanical and thermal properties, but is sufficiently stable to permit such things as ethyloxide sterilization without degradation and/or significant loss of function. In general outline, the present invention is directed to a hyperbranched amino acid-based poly(ester urea) (PEU) made from an interfacial polycondensation reaction between linear and branched amino acid-based polyester monomers and a urea forming material such as trisphosgene or phosgene. It has been found that by controlling the amount of branched monomer incorporated into the copolymer, the mechanical properties and water uptake abilities of the resulting hyperbranched amino acid-based PEUs may be tuned. The hyperbranched PEUs nanofibers are sterilizable with ETO and are stable for long periods of ETO sterilization, elevated temperature and exposure to aqueous environments. In various embodiments, the hyperbranched amino acid-based PEUs are also biodegradable and can be formed into fibers. It is believed these materials will enable further development of scaffolds for regenerative medicine with improved mechanical properties, as well as improved drug delivery systems.

As set forth above, the hyperbranched amino acid-based PEUs of the present invention may be made from the reaction of a linear amino acid based diester monomer, a branched amino acid-based polyester monomer, and a urea forming material such as trisphosgene or phosgene. As will be discussed in more detail below, however, in most embodiments, the linear amino acid based diester monomer and branched amino acid-based polyester monomer are used in their counter-ion protected form to prevent transamidation of the ester bonds on the polyester backbone of the monomers. Accordingly, the PEUs of the various embodiments of the present invention may comprise a series of linear amino acid-based diester segments/units and branched amino acid-based polyester segments/units, joined together by urea bonds, wherein each linear amino acid-based diester segment/unit is formed from the counter-ion protected linear amino acid-based diester monomers and each branched amino acid-based polyester segment/unit formed from the counter-ion protected branched amino acid-based polyester monomers used to make the hyperbranched amino acid-based PEU polymer.

As used herein, the term "residue(s)" is used to refer generally to the part of a monomer or other chemical unit that has been incorporated into a polymer or large molecule. By extension, the terms "residue of an amino acid" and "amino acid residue" are used interchangeably to refer to part of the amino acids used to form the counter-ion protected linear amino acid-based diester monomers and counter-ion protected branched amino acid-based polyester monomers that are used to make the hyperbranched amino acid-based PEU polymer of embodiments of the present invention. Similarly, the terms "residue of a diol" and "diol residue," are used interchangeably to refer to the part of the diol used to form the counter-ion protected linear amino acid-based diester monomers that is incorporated into that monomer's structure and the terms "residue of a polyol" and "polyol residue" are used interchangeably to refer to the part of the polyol used to form the counter-ion protected branched amino acid-based polyester monomers that is incorporated into that monomer's structure.

Likewise, the terms "linear monomer residue," "diester monomer residue," "linear diester monomer residue" "amino acid-based diester monomer residue," and "linear amino acid-based diester monomer residue" are used interchangeably to refer to the part of the counter-ion protected linear amino acid-based diester monomer used to form the hyperbranched amino acid-based PEU polymer of embodiments of the present invention, which is incorporated into the PEU's structure and the terms "branched monomer residue" "polyester monomer residue," "branched polyester monomer residue," "amino acid-based polyester monomer residue," and "branched amino acid-based polyester monomer residue," are used interchangeably to refer to the part of the counter-ion protected branched amino acid-based polyester monomer used to form the hyperbranched amino acid-based PEU polymer of embodiments of the present invention, which is incorporated into the PEU's structure and the terms.

Hyperbranched polymers belong to a class of synthetic tree-like macromolecules called dendritic polymers. They are polymers with densely branched structure and a large number of end groups. Dendritic polymers include dendrimers which have completely branched star-like topologies and hyperbranched polymers which have imperfectly branched or irregular structures. Both dendrimer and hyperbranched polymer molecules are composed of repeating units emanating from a central core. The core is characterized by its functionality, which is the number of chemical bonds through which it can be connected to the external parts of the molecule. The functionality of the core is normally three (e.g. amine) or four functional units. Through the bonds of the core, the layers of linear units (single monomers or linear chains) are attached to the core and each of these arms is terminated with the multifunctional branched unit. Larger molecules are created by adding shells of linear units to the end groups of the layer beneath. If all of these units are attached to the molecule perfectly, a dendrimer is formed. In contrast, the absence of any of these units in the molecule will result in a hyperbranched polymer structure. Accordingly, as used herein, the term "hyperbranched" used in reference to a polymer refers to a polymer with a densely branched structure and a large number of end groups that, when compared to a dendrimer, has imperfectly branched or irregular structures.

Finally, the terms "linear monomer segment(s)," "linear monomer unit(s)," "diester monomer segment(s)," "diester monomer unit(s)," "linear diester monomer segment(s)," "linear diester monomer unit(s)," "amino acid-based diester monomer segment(s)," "amino acid-based diester monomer unit(s)," "linear amino acid-based diester monomer segment(s)," and "linear amino acid-based diester monomer units(s)," are used interchangeably to refer to discrete segments of the hyperbranched amino acid-based PEU polymer of embodiments of the present invention comprising the residues of one or more of the counter-ion protected linear amino acid-based diester monomer used to form the PEU and the terms "branched monomer segment(s)," "branched monomer unit(s)," "polyester monomer segment(s)," "polyester monomer unit(s)," "branched polyester monomer segment(s)," "branched polyester monomer unit(s)," "amino acid-based polyester monomer segment(s)," "amino acid-based polyester monomer unit(s)," "branched amino acid-based polyester monomer segment(s)," and "branched amino acid-based polyester monomer segment(s)," are used interchangeably to refer to discrete segments of the hyperbranched amino acid-based PEU polymer of embodiments of the present invention comprising the residues of one or more of the counter-ion protected branched amino acid-based polyester monomer used to form the PEU.

In one or more embodiments, the linear amino acid-based diester monomer segment(s) of the hyperbranched amino acid-based PEU polymer of the present invention may comprise two terminal amino acid residues separated by from about 2 to about 20 carbon atoms. In some embodiments, the terminal amino acid residues of the linear amino acid-based diester monomer segment(s) may comprise the residues any α-amino acid other than proline. In some embodiments, terminal amino acid residues of the linear amino acid-based diester monomer segment(s) may comprise the residues of alanine (ala-A), arginine (arg-R), asparagine (asn-N), aspartic acid (asp-D), cysteine (cys-C), glutamine (gln-Q), glutamic acid (glu-E), glycine (gly-G), histidine (his-H), isoleucine (ile-I), leucine (leu-L), lysine (lys-K), methionine (met-M), phenylalanine (phe-F), serine (ser-S), threonine (thr-T), tryptophan (trp-W), tyrosine (tyr-Y), valine (val-V), or any combinations or derivatives thereof. In some embodiments, the terminal amino acid residues of the linear amino acid-based diester monomer segment(s) may comprise residues of phenylalanine or tyrosine.

As set forth above, in some embodiments the two terminal amino acid residues of each linear amino acid-based diester monomer segment may be separated from each other by from about 2 to about 20 carbon atoms. In some of these embodiments, the terminal amino acid residues are separated by from about 2 to about 15 carbon atoms. In some of these embodiments, the terminal amino acid residues are separated by from about 2 to about 10 carbon atoms. In some of these embodiments, the terminal amino acid residues are separated by from about 4 to about 12 carbon atoms. In some of these embodiments, the terminal amino acid residues are separated by from about 6 to about 12 carbon atoms. In some of these embodiments, the terminal amino acid residues are separated by from about 6 to about 15 carbon atoms. In some of these embodiments, the terminal amino acid residues are separated by from about 8 to about 12 carbon atoms.

As will be discussed in more detail below, the linear amino acid-based diester monomers may be formed by reacting two amino acids with a linear diol. Accordingly the two terminal amino acid residues in the linear amino acid-based diester monomer segments may be said to be separated from each other by the residue of a linear diol. In some embodiments, the amino acids residues may be separated from each other by the residue of a linear diol including, without limitation, 1,6-hexanediol, 1,8-octanediol, 1,9-nonanediol, 1,10-decanediol, 1,11-undecanediol, 1,12-dodecanediol, 1,13-tridecanediol, 1,14-tetradecanediol, 1,15-pentadecanediol, 1,16-hexadecanediol, 1,17-heptadecanediol, 1,18-octadecanediol, 1,19-nonadecanediol, 1,20-icosanediol, and combinations thereof. In the embodiments, the diol may be 1,8-octanediol and is commercially available from Sigma Aldrich Company LLC (St. Louis, Mo.) or Alfa Aesar (Ward Hill, Mass.).

In some embodiments, both of the terminal amino acid residues in a particular linear amino acid-based diester monomer segment may be the same, but this need not be the case. In some other embodiments, a particular amino acid-based polyester segment may contain different amino acid residues. Moreover, while the linear amino acid-based diester monomer segments will have only two terminal amino acid residues, they may, in some embodiments also include one or more other amino acid residues.

In some embodiments, the linear amino acid-based diester segments may have the formula:

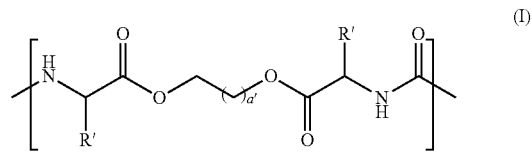

(I)

wherein R' is —CH$_3$, —(CH$_2$)$_3$NHC(NH$_2$)C=NH, —CH$_2$CONH$_2$, —CH$_2$COOH, —CH$_2$SH, —(CH$_2$)$_2$COOH, —(CH$_2$)$_2$CONH$_2$, —NIH, —CH$_2$C=CH—N=CH—NH, —CH(CH$_3$)CH$_2$CH$_3$, —CH$_2$CH(CH$_3$)$_2$, —(CH$_2$)$_4$NH$_2$, —(CH$_2$)$_2$SCH$_3$, —CH$_2$Ph, —CH$_2$OH, —CH(OH)CH$_3$, —CH$_2$—C=CH—NH-Ph, —CH$_2$-Ph-OH, —CH(CH$_3$)$_2$, or —CH$_2$C$_6$H$_4$OCH$_2$C$_6$H$_5$; and a' is an integer from 1 to 20. In some of these embodiments, a' may be an integer from about 1 to about 18. In some of these embodiments, a' may be an integer from about 1 to about 15. In some of these embodiments, a' may be an integer from about 1 to about 10. In some of these embodiments, a' may be an integer from about 1 to about 8. In some of these embodiments, a' may be an integer from about 1 to about 6. In some of these embodiments, a' may be an integer from about 2 to about 20. In some of these embodiments, a' may be an integer from about 5 to about 20. In some of these embodiments, a' may be an integer from about 10 to about 20. In some of these embodiments, a' may be an integer from about 6 to about 12.

In one or more embodiments, the branched amino acid-based polyester monomer segment(s) of the hyperbranched amino acid-based PEU polymer of the present invention may comprise three or more terminal amino acid residues connected by a branched carbon chain. In some embodiments, the terminal amino acid residues of the branched amino acid-based polyester monomer segment(s) may comprise the residues any α-amino acid other than proline. In some embodiments, terminal amino acid residues of the branched amino acid-based polyester monomer segment(s) may comprise the residues of alanine (ala-A), arginine (arg-R), asparagine (asn-N), aspartic acid (asp-D), cysteine (cys-C), glutamine (gln-Q), glutamic acid (glu-E), glycine (gly-G), histidine (his-H), isoleucine (ile-I), leucine (leu-L), lysine (lys-K), methionine (met-M), phenylalanine (phe-F), serine (ser-S), threonine (thr-T), tryptophan (trp-W), tyrosine (tyr-Y), valine (val-V), or any combinations or derivatives thereof. In some embodiments, the terminal amino acid residues of the branched amino acid-based polyester monomer segment(s) may comprise residues of phenylalanine or tyrosine. In most embodiments, all of the terminal amino acid residues in a particular branched amino acid-based polyester monomer segment may be the same, but this need not be the case. In some other embodiments, a branched amino acid-based polyester monomer segment may contain different amino acid residues.

In some embodiments, the terminal amino acid residues of the branched amino acid-based polyester monomer segment(s) may be separated from each other by from about 2 to about 60 carbon atoms. In some of these embodiments, the amino acid residues are separated by from about 2 to about 40 carbon atoms. In some of these embodiments, the amino acid residues are separated by from about 2 to about 20 carbon atoms. In some of these embodiments, the amino acid residues are separated by from about 10 to about 60 carbon atoms. In some of these embodiments, the amino acid residues are separated by from about 20 to about 60 carbon atoms. In some of these embodiments, the amino acid residues are separated by from about 30 to about 60 carbon atoms. In some of these embodiments, the amino acid residues are separated by from about 40 to about 60 carbon atoms. In some of these embodiments, the amino acid residues are separated by from about 6 to about 15 carbon atoms.

In some embodiments, the branched amino acid-based polyester monomer segment(s) may comprise the residue of an L amino acid-1,1,1-trimethyl ethane triester, wherein the amino acid is selected from the group consisting of phenylalanine, alanine, arginine, asparagine, aspartate, cysteine, glutamic acid, glutamine, glycine, proline, serine, tyrosine; isoleucine, leucine, lysine, methionine, phenylalanine, threonine, tryptophan and valine and/or combinations thereof. In some embodiments, the branched amino acid-based polyester monomer segment(s) may be the residue of the hydrochloric acid salt of tri-o-benzyl-L-tyrosine-1,1,1-trimethyl ethane-triester.

As will be discussed in more detail below, the branched amino acid-based polyester monomers that form the branched amino acid-based polyester monomer segment(s) may be formed by reacting three or more α-amino acid (other than proline) with a branched polyol. Accordingly the three or more terminal amino acid residues in the branched amino acid-based polyester monomer segment(s) may be said to be separated from each other by the residue of a branched polyol. In some other embodiments, the three or more terminal amino acids residues may be separated from each other by the residue of a branched polyol including, without limitation, 2-butene-1,4-diol, 3,4-dihydroxy-1-butene, 7-octene-1,2-diol, 3-hexene-1,6-diol, 1,4-butynediol, trimethylolpropane allyl ether, 3-allyloxy-1,2-propanediol, 2,4-hexadiyne-1,6-diol, 2-hydroxymethyl-1,3-propanediol, 1,1,1-tris(hydroxymethyl)propane, 1,1,1-tris(hydroxymethyl)ethane, pentaerythritol, di(trimethylolpropane)dipentaerythritol and combinations thereof.

It has been found that by controlling the amount of branched amino acid-based polyester monomer segment(s) in the PEU, the mechanical properties and water uptake abilities of the resulting hyperbranched amino acid-based PEUs may be tuned. The water uptake of these PEU polymers determines their degradation rate in vitro and in vivo, and by tuning the water uptake properties of these PEU polymers, their degradation rate in vitro and in vivo may likewise be tuned.

In one or more embodiments, the branched amino acid-based polyester monomer segments comprise from about 0.5 mole percent to about 20 mole percent of hyperbranched amino acid-based PEUs of the present invention. In some of the embodiments, the branched amino acid-based polyester monomer segments comprise from about 0.5 mole percent to about 10 mole percent of hyperbranched amino acid-based PEUs of the present invention. In some of the embodiments, the branched amino acid-based polyester monomer segments comprise from about 0.5 mole percent to about 5 mole percent of hyperbranched amino acid-based PEUs of the present invention. In some of the embodiments, the branched amino acid-based polyester monomer segments comprise from about 0.5 mole percent to about 4 mole percent of hyperbranched amino acid-based PEUs of the present invention. In some of the embodiments, the branched amino acid-based polyester monomer segments comprise from about 0.5 mole percent to about 3 mole percent of hyperbranched amino acid-based PEUs of the present invention. In some of the embodiments, the branched amino acid-based polyester monomer segments comprise from about 0.5 mole percent to about 2 mole percent of hyperbranched amino acid-based PEUs of the present invention. In some of the embodiments, the branched amino acid-based polyester monomer segments comprise from about 0.5 mole percent to about 1 mole percent of hyperbranched amino acid-based PEUs of the present invention.

In one or more embodiments, the hyperbranched amino acid-based PEUs of the present invention have a weight average molecular weight ($M_w$) of from about 10,000 daltons to about 1,000,000 daltons. In some of the embodiments, the hyperbranched amino acid-based PEUs of the present invention have a weight average molecular weight ($M_w$) of from about 10,000 daltons to about 500,000 daltons. In some of the embodiments, the hyperbranched amino acid-based PEUs of the present invention have a weight average molecular weight ($M_w$) of from about 10,000 daltons to about 250,000 daltons. In some of the embodiments, the hyperbranched amino acid-based PEUs of the present invention have a weight average molecular weight ($M_w$) of from about 10,000 daltons to about 100,000 daltons. In some of the embodiments, the hyperbranched amino acid-based PEUs of the present invention have a weight average molecular weight ($M_w$) of from about 10,000 daltons to about 50,000 daltons. In some of the embodiments, the hyperbranched amino acid-based PEUs of the present invention have a weight average molecular weight ($M_w$) of from about 100,000 daltons to about 1,000,000 daltons. In some of the embodiments, the hyperbranched amino acid-based PEUs of the present invention have a weight average molecular weight ($M_w$) of from about 200,000 daltons to about 1,000,000 daltons. In some of the embodiments, the hyperbranched amino acid-based PEUs of the present invention have a weight average molecular weight ($M_w$) of from about 500,000 daltons to about 1,000,000 daltons. In some of the embodiments, the hyperbranched amino acid-based PEUs of the present invention have a weight average molecular weight ($M_w$) of from about 20,000 daltons to about 100,000 daltons.

In one or more embodiments, the hyperbranched amino acid-based PEUs of the present invention have a number average molecular weight ($M_n$) of from about 5,000 daltons to about 500,000 daltons. In some of the embodiments, the hyperbranched amino acid-based PEUs of the present invention have a number average molecular weight ($M_n$) of from about 5,000 daltons to about 250,000 daltons. In some of the embodiments, the hyperbranched amino acid-based PEUs of the present invention have a number average molecular weight ($M_n$) of from about 5,000 daltons to about 125,000 daltons. In some of the embodiments, the hyperbranched amino acid-based PEUs of the present invention have a number average molecular weight ($M_n$) of from about 5,000 daltons to about 67,500 daltons. In some of the embodiments, the hyperbranched amino acid-based PEUs of the present invention have a number average molecular weight ($M_n$) of from about 5,000 daltons to about 50,000 daltons. In some of the embodiments, the hyperbranched amino acid-based PEUs of the present invention have a number average molecular weight ($M_n$) of from about 5,000 daltons to about 25,000 daltons. In some of the embodiments, the hyperbranched amino acid-based PEUs of the present invention have a number average molecular weight ($M_n$) of from about 20,000 daltons to about 500,000 daltons. In some of the embodiments, the hyperbranched amino acid-based PEUs of the present invention have a number average molecular weight ($M_n$) of from about 50,000 daltons to about 500,000 daltons. In some of the embodiments, the hyperbranched amino acid-based PEUs of the present invention have a number average molecular weight ($M_n$) of from about 250,000 daltons to about 500,000 daltons. In some of the embodiments, the hyperbranched amino acid-based PEUs of the present invention have a number average molecular weight ($M_n$) of from about 10,000 daltons to about 300,000 daltons.

In one or more embodiments, the hyperbranched amino acid-based PEUs of the present invention have a glass transition temperature ($T_g$) of from about 40° C. to about 70° C. In some of the embodiments, the hyperbranched amino acid-based PEUs of the present invention have a glass transition temperature ($T_g$) of from about 40° C. to about 65° C. In some of the embodiments, the hyperbranched amino acid-based PEUs of the present invention have a glass transition temperature ($T_g$) of from about 40° C. to about 60° C. In some of the embodiments, the hyperbranched amino acid-based PEUs of the present invention have a glass transition temperature ($T_g$) of from about 40° C. to about 55° C. In some of the embodiments, the hyperbranched amino acid-based PEUs of the present invention have a glass transition temperature ($T_g$) of from about 40° C. to about 50° C. In some of the embodiments, the hyperbranched amino acid-based PEUs of the present invention have a glass transition temperature ($T_g$) of from about 40° C. to about 55° C. In some of the embodiments, the hyperbranched amino acid-based PEUs of the present invention have a glass transition temperature ($T_g$) of from about 45° C. to about 70° C. In some of the embodiments, the hyperbranched amino acid-based PEUs of the present invention have a glass transition temperature ($T_g$) of from about 55° C. to about 70° C. In some of the embodiments, the hyperbranched amino acid-based PEUs of the present invention have a glass transition temperature ($T_g$) of from about 65° C. to about 70° C. In some of the embodiments, the hyperbranched amino acid-based PEUs of the present invention have a glass transition temperature ($T_g$) of from about 45° C. to about 60° C.

In one or more embodiments, the hyperbranched amino acid-based PEUs of the present invention have an onset degradation temperature ($T_d$) of from about 270° C. to about 320° C. In some of the embodiments, the hyperbranched amino acid-based PEUs of the present invention have an onset degradation temperature ($T_d$) of from about 280° C. to about 320° C. In some of the embodiments, the hyperbranched amino acid-based PEUs of the present invention have an onset degradation temperature ($T_d$) of from about 295° C. to about 320° C. In some of the embodiments, the hyperbranched amino acid-based PEUs of the present invention have an onset degradation temperature ($T_d$) of from about 305° C. to about 320° C. In some of the embodiments, the hyperbranched amino acid-based PEUs of the present invention have an onset degradation temperature ($T_d$) of from about 270° C. to about 310° C. In some of the embodiments, the hyperbranched amino acid-based PEUs of the present invention have an onset degradation temperature ($T_d$) of from about 270° C. to about 295° C. In some of the embodiments, the hyperbranched amino acid-based PEUs of the present invention have an onset degradation temperature ($T_d$) of from about 270° C. to about 280° C. In some of the embodiments, the hyperbranched amino acid-based PEUs of the present invention have an onset degradation temperature ($T_d$) of from about 275° C. to about 310° C. In some of the embodiments, the hyperbranched amino acid-based PEUs of the present invention have an onset degradation temperature ($T_d$) of from about 280° C. to about 300° C.

In one or more embodiments, the hyperbranched amino acid-based PEUs of the present invention have a molecular mass distribution ($Đ_m$) of from about 1.5 to about 10.0. In some of the embodiments, the hyperbranched amino acid-based PEUs of the present invention have a molecular mass distribution ($Đ_m$) of from about 1.5 to about 7.5. In some of the embodiments, the hyperbranched amino acid-based PEUs of the present invention have a molecular mass distribution ($Đ_m$) of from about 1.5 to about 5.0. In some of the embodiments, the hyperbranched amino acid-based PEUs of the present invention have a molecular mass distribution ($Đ_m$) of from about 1.5 to about 2.5. In some of the embodiments, the hyperbranched amino acid-based PEUs of the present invention have a molecular mass distribution ($Đ_m$) of from about 3.5 to about 10. In some of the embodiments, the hyperbranched amino acid-based PEUs of the present invention have a molecular mass distribution ($Đ_m$) of from about 5.5 to about 10. In some of the embodiments, the hyperbranched amino acid-based PEUs of the present invention have a molecular mass distribution ($Đ_m$) of from about 7.0 to about 10. In some of the embodiments, the hyperbranched amino acid-based PEUs of the present invention have a molecular mass distribution ($Đ_m$) of from about 8.5 to about 10. In some of the embodiments, the hyperbranched amino acid-based PEUs of the present invention have a molecular mass distribution ($Đ_m$) of from about 2.5 to about 7.5. In some of the embodiments, the hyperbranched amino acid-based PEUs of the present invention have a molecular mass distribution ($Đ_m$) of from about 3.0 to about 6.0.

In one or more embodiments, the hyperbranched amino acid-based PEUs of the present invention have an elastic modulus of from about 1.0 GPa to about 5.0 GPa at room temperature. In some of the embodiments, the hyperbranched amino acid-based PEUs of the present invention have an elastic modulus of from about 1.0 GPa to about 4.0 GPa at room temperature. In some of the embodiments, the hyperbranched amino acid-based PEUs of the present invention have an elastic modulus of from about 1.0 GPa to about 3.0 GPa at room temperature. In some of the embodiments, the hyperbranched amino acid-based PEUs of the present invention have an elastic modulus of from about 1.0 GPa to about 2.0 GPa at room temperature. In some of the embodiments, the hyperbranched amino acid-based PEUs of the present invention have an elastic modulus of from about 1.5 GPa to about 5.0 GPa at room temperature. In some of the embodiments, the hyperbranched amino acid-based PEUs of the present invention have an elastic modulus of from about 2.5 GPa to about 5.0 GPa at room temperature. In some of the embodiments, the hyperbranched amino acid-based PEUs of the present invention have an elastic modulus of from about 3.5 GPa to about 5.0 GPa at room temperature. In some of the embodiments, the hyperbranched amino acid-based PEUs of the present invention have an elastic modulus of from about 4.5 GPa to about 5.0 GPa at room temperature. In some of the embodiments, the hyperbranched amino acid-based PEUs of the present invention have an elastic modulus of from about 1.5 GPa to about 3.5 GPa at room temperature.

In another aspect, the present invention is directed a hyperbranched amino acid-based PEU as described above comprising the reaction product of a protected linear amino-acid-based diester monomer containing two terminal amino acid residues, a protected branched amino-acid-based polyester monomer containing three or more terminal amino acid residues, and a urea bond forming material, as well as related methods for its formation.

In various embodiments, the counter-ion protected linear amino acid-based diester monomers used to form the hyperbranched amino acid-based PEUs of the present invention may be formed by reacting two or more amino acids with a linear diol and protecting the resulting linear amino acid-based diester monomer. As set forth above, the amino acid or acids used to form the counter-ion protected linear amino acid-based diester monomers used to form the hyperbranched amino acid-based PEUs of the present invention may be any α-amino acid other than proline. In some embodiments, amino acid or acids used to form the counter-ion protected linear amino acid-based diester monomers may be alanine (ala-A); arginine (arg-R); asparagine (asn-N); aspartic acid (asp-D); cysteine (cys-C); glutamine (gln-Q); glutamic acid (glu-E); glycine (gly-G); histidine (his-H); isoleucine (ile-I); leucine (leu-L); lysine (lys-K); methionine (met-M); phenylalanine (phe-F); serine (ser-S); threonine (thr-T); tryptophan (trp-W); tyrosine (tyr-Y); valine (val-V) or any combination or derivative thereof. In some embodiments, the amino acid or acids used to form the counter-ion protected linear amino acid-based diester monomers may be a functionalized or protected α-amino acid. In some embodiments, amino acid or acids used to form the counter-ion protected linear amino acid-based diester monomers may comprise one or more benzyl protected tyrosine molecules or tert-butyloxycarbonyl (BOC) protected tyrosine molecules.

In one or more of these embodiments, the amino acid or acids are reacted with a linear diol having from 2 to 20 carbon atoms and an acid to form a counter-ion protected amino acid-based diester monomer. In some embodiments, the diol may have from 2 to 15 carbon atoms. In some embodiments, the diol may have from 2 to 10 carbon atoms. In some embodiments, the diol may have from 2 to 7 carbon atoms. In some embodiments, the diol may have from 5 to 20 carbon atoms. In some embodiments, the diol may have from 10 to 20 carbon atoms. In some embodiments, the diol may have from 15 to 20 carbon atoms. In some embodiments, the diol may have from 4 to 12 carbon atoms. In some embodiments, the diol may have from 6 to 8 carbon atoms.

Suitable linear diols may include, without limitation, 1,6-hexanediol, 1,8-octanediol, 1,9-nonanediol, 1,10-decanediol, 1,11-undecanediol, 1,12-dodecanediol, 1,13-tridecanediol, 1,14-tetradecanediol, 1,15-pentadecanediol, 1,16-hexadecanediol, 1,17-heptadecanediol, 1,18-octadecanediol, 1,19-nonadecanediol, 1,20-icosanediol, 2-butene-1,4-diol, 3,4-dihydroxy-1-butene, 7-octene-1,2-diol, 3-hexene-1,6-diol, 1,4-butynediol, trimethylolpropane allyl ether, 3-allyloxy-1,2-propanediol, 2,4-hexadiyne-1,6-diol, 2-hydroxymethyl-1,3-propanediol, and combinations thereof. In the embodiments, the polyol may be 1,8-octanediol and is commercially available from Sigma Aldrich Company LLC (St. Louis, Mo.) or Alfa Aesar (Ward Hill, Mass.).

In some embodiments, the counter-ion protected linear amino acid-based diester monomers are formed by first dissolving one or more selected amino acids and selected polyol in a suitable solvent. One of ordinary skill in the art will also be able to select a suitable solvent for the selected amino acid or acids and the selected diol the without undue experimentation. Suitable solvents include without limitation, toluene, dichloromethane, chloroform, dimethylformamide (DMF) or combinations thereof. In some embodiments, the solvent used may be toluene.

Further, as will be apparent to those of skill in the art, steps should be taken to prevent transamidation of the ester bonds on the diester. In some embodiments, transamidation may be prevented or limited by protecting the amine groups on the amino acid-based diester monomers being formed with one or more counter-ions. Accordingly, a suitable acid or other source of counter-ions may be added to the solution prior to or during formation of the diester monomer. One of ordinary skill in the art will be able to select a suitable counter-ion without undue experimentation. Materials capable of producing suitable protecting counter-ions may include without limitation, p-toluene sulfonic acid monohydrate, chlorides, bromides, acetates. trifloroacetate, or combinations thereof. In some embodiments, the acid used may be p-toluene sulfonic acid monohydrate. In some embodiments, the acid used may be HCl.

In some of these embodiments, the solution is then heated to a temperature of from 110° C. to about 114° C. and refluxed for from about 20 hours to about 48 hours to form a counter-ion protected amino acid-based diester monomer having two or more amino acid residues separated by from about 2 to about 20 carbon atoms, depending upon the diol used. (See Scheme 1, below). In some embodiments, the solution is heated to a temperature of from about 110° C. to about 112° C. In some embodiments, the solution is heated to a temperature of about 110° C. In some of these embodiments, the solution may be refluxed for from about 20 hours to about 40 hours. In some of these embodiments, the solution may be refluxed for from about 20 hours to about 30 hours. In some of these embodiments, the solution may be refluxed for from about 20 hours to about 24 hours.

The crude product of these reactions may be purified using any means known in the art for that purpose, including, without limitation, filtration, crystallization, or column chromatography. One or ordinary skill in the art would know how to purify these products without undue experimentation. In some embodiments, the crude reaction product may be purified by first vacuum filtering to remove the residual solvent and then decolorized in activated carbon to remove any residual salts or unreacted monomers. In some embodiments, the crude reaction product may then be recrystallized from boiling water from 1 to 10 times to produce a purified product. In some embodiments, the crude product may be recrystallized from a 1:1 mixture of water and alcohol from 1 to 10 times to produce a purified product. In some embodiments, after cooling to ambient temperature, the crude product may be filtered, washed with diethyl ether and then recrystallized with water. In some embodiments, the crude product may be filtered, washed with diethyl ether, and collected by vacuum filtration. In some embodiments, the crude product was filtered, concentrated and dissolved in CHCl$_3$, washed with 5% HCl twice, brine once, dried over Na$_2$SO$_4$ and the solvent removed in vaccuo to produce the purified product.

In some embodiments, the amino acid-based linear diester monomers may be synthesized as shown in Scheme 1, below.

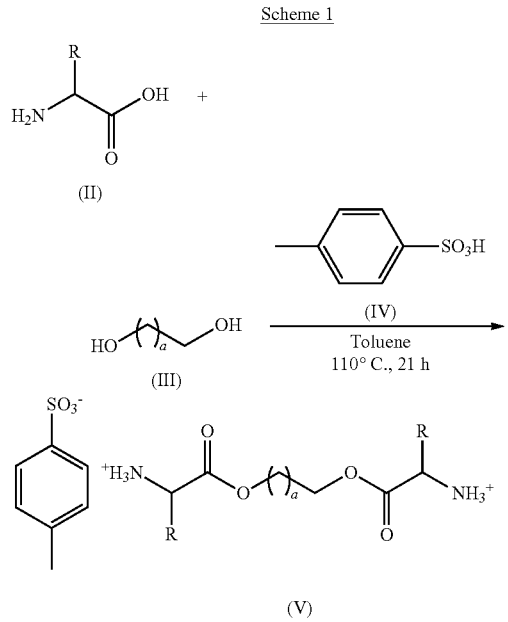

Scheme 1 wherein R is an amino acid side chain and a is an integer from about 2 to about 20. In some embodiments, R may be any one or more of —CH$_3$, —(CH$_2$)$_3$NHC(NH$_2$)C=NH, —CH$_2$CONH$_2$, —CH$_2$COOH, —CH$_2$SH, —(CH$_2$)$_2$COOH, —(CH$_2$)$_2$CONH$_2$, —NH$_2$, —CH$_2$C=CH—N=CH—NH, —CH(CH$_3$)CH$_2$CH$_3$, —CH$_2$CH(CH$_3$)$_2$, —(CH$_2$)$_2$SCH$_3$, —CH$_2$Ph, —CH$_2$OH, —CH(OH)CH$_3$, —CH$_2$—C=CH—NH-Ph, —CH$_2$-Ph-OH, —CH(CH$_3$)$_2$, or —CH$_2$C$_6$H$_4$OCH$_2$C$_6$H$_5$. In some embodiments, formula II may be a benzyl protected tyrosine, a tert-butyloxycarbonyl (BOC) protected tyrosine or another functionalized or protected α-amino acid. In some of these embodiments, a may be an integer from about 1 to about 20. In some of these embodiments, a may be an integer from about 1 to about 15. In some of these embodiments, a may be an integer from about 1 to about 12. In some of these embodiments, a may be an integer from about 10 to about 20. In some of these embodiments, a may be an integer from about 4 to about 12. In some of these embodiments, a may be an integer from about 6 to about 12. In some of these embodiments, a may be 8.

In the embodiments shown in Scheme 1 above, one or more amino acids II, a linear diol having from 2 to 20 carbon atoms III, and p-toluene sulfonic acid monohydrate IV are dissolved in toluene, heated to a temperature of about 110° C. and refluxed for about 21 hours to produce the di-p-toluene sulfonic acid salt of an amino acid-based diester monomer V having two or more amino acid residues separated by from about 2 to about 20 carbon atoms, depending upon the diol III used. (See also, Examples 1-5). In some embodiments, the amino acid II, diol III and acid may be dissolved in a suitable solvent such as toluene, DMF, and 1,4-paradioxane. One of ordinary skill in the art will be able to select a suitable solvent without undue experimentation.

In some other embodiments, a counter-ion protected amino acid-based linear diester monomer according to one or more embodiments of the present invention may be synthesized as shown in Scheme 2, below.

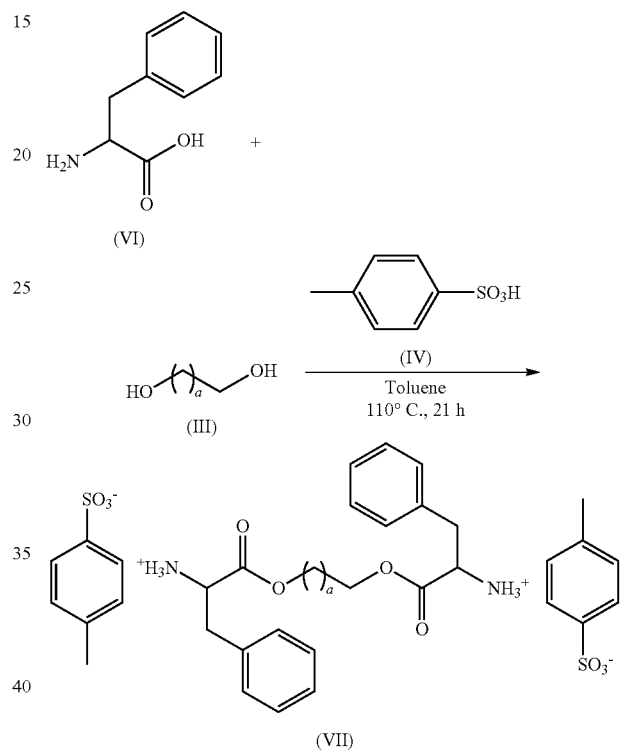

Scheme 2 wherein a is an integer from about 1 to about 20. In some of these embodiments, a may be an integer from about 1 to about 15. In some of these embodiments, a may be an integer from about 1 to about 12. In some of these embodiments, a may be an integer from about 10 to about 20. In some of these embodiments, a may be an integer from about 4 to about 12. In some of these embodiments, a may be an integer from about 6 to about 12. In some of these embodiments, a may be 8.

In the embodiments shown in Scheme 2 above, L-phenylalanine VI, a linear diol having from 2 to 20 carbon atoms III, and p-toluene sulfonic acid monohydrate IV are dissolved in toluene, heated to a temperature of from about 110° C. and refluxed for about 21 hours produce the di-p-toluene sulfonic acid salt of a L-phenylalanine based diester monomer VII having two phenylalanine residues separated by from about 2 to about 20 carbon atoms, depending upon the diol III used. (See Scheme 2, above). In some of these embodiments, the solution may be heated to a temperature of from about 110° C. to about 112° C. In some of these embodiments, the solution may be refluxed for from about 20 hours to about 48 hours. In some of these embodiments, the solution may be refluxed for from about 20 hours to about 40 hours. In some of these embodiments, the solution may be refluxed for from about 20 hours to about 30 hours. In some embodiments, the di-p-toluene sulfonic acid salt of an L-phenylalanine based diester monomer VII, having two L-phenylalanine residues separated by from about 2 to about 20 carbon atoms, may be synthesized as set forth in Examples 1 and 3.

In some embodiments, counter-ion protected linear amino acid-based diester monomers according to one or more embodiments of the present invention may be synthesized from L-leucine VIII, a linear diol from 2 to 20 carbon atoms in length III, and p-toluene sulfonic acid monohydrate IV as shown in Scheme 3, below.

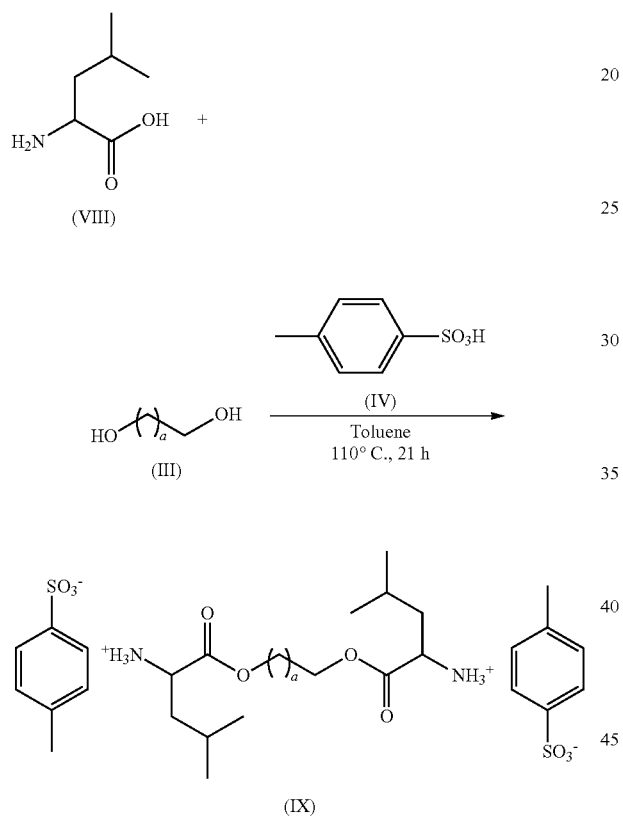

wherein a is an integer from about 1 to about 20. In some of these embodiments, a may be an integer from about 1 to about 15. In some of these embodiments, a may be an integer from about 1 to about 12. In some of these embodiments, a may be an integer from about 10 to about 20. In some of these embodiments, a may be an integer from about 4 to about 12. In some of these embodiments, a may be an integer from about 6 to about 12. In some of these embodiments, a may be an integer from about 6 to about 10.

In the embodiments shown in Scheme 3 above, L-leucine VIII, linear diol of from 2 to 20 carbon atoms in length III, and p-toluene sulfonic acid monohydrate IV are dissolved in toluene, heated to a temperature of from about 110° C. and refluxed for about 21 hours produce the di-p-toluene sulfonic acid salt of an L-leucine based diester monomer IX having two L-leucine residues separated by from about 2 to about 20 carbon atoms, depending upon the diol III used. (See Scheme 3, above). One of ordinary skill in the art will be able to select a suitable solvent or solvents without undue experimentation. In some of these embodiments, the solution may be heated to a temperature of from about 110° C. to about 112° C. In some of these embodiments, the solution may be refluxed for from about 20 hours to about 48 hours. In some of these embodiments, the solution may be refluxed for from about 20 hours to about 40 hours. In some of these embodiments, the solution may be refluxed for from about 20 hours to about 30 hours. In some embodiments, the di-p-toluene sulfonic acid salt of an L-leucine based diester monomer IX, having two L-leucine residues separated by from about 2 to about 20 carbon atoms, may be synthesized as set forth in Example 2, below.

In some other embodiments, another type of counter-ion protected amino acid-based diester monomers according to the invention having one or more benzyl protected tyrosine residues may be synthesized as shown in Scheme 4, below.

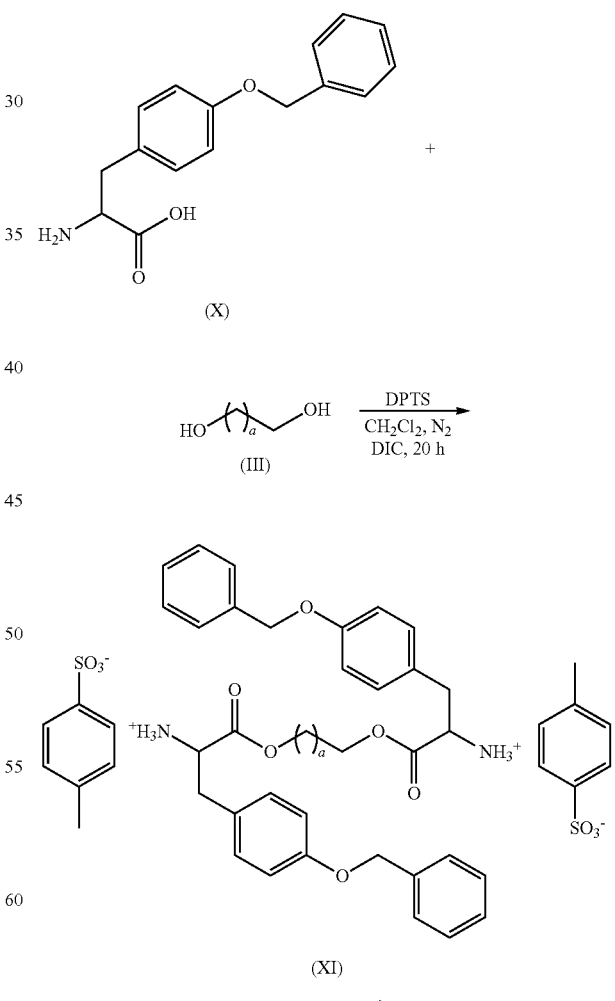

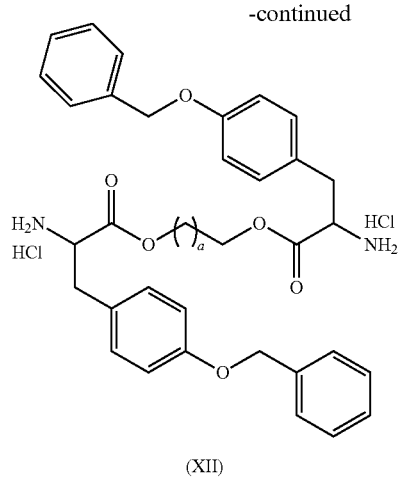

(XII)

wherein a is an integer from about 1 to about 20. In some of these embodiments, a may be an integer from about 1 to about 15. In some of these embodiments, a may be an integer from about 1 to about 12. In some of these embodiments, a may be an integer from about 10 to about 20. In some of these embodiments, a may be an integer from about 4 to about 12. In some of these embodiments, a may be an integer from about 6 to about 12. In some of these embodiments, a may be an integer from about 8 to about 12.

In these embodiments, a benzyl protected tyrosine X is used as the amino acid for the formation of the counter-ion protected diester monomer. In these embodiments, the method used to produce the counter-ion protected diester monomer described above may be modified slightly to produce the di-p-toluene sulfonic acid salt of the benzyl protected tyrosine based diester monomer XI, as shown in the first part of Scheme 4, above. In these embodiments, the benzyl protected L-tyrosine X (N-Boc-O-benzyl-L-tyrosine), a linear diol of from about 2 to about 20 carbon atoms in length III, and a suitable coupling agent such as 4-(dimethylamino)pyridinium 4-toluenesulfonate (DPTS) are first dissolved in a suitable solvent (such as anhydrous dichloromethane) under a nitrogen atmosphere. One of ordinary skill in the art will be able to select a suitable coupling agent without undue experimentation. Suitable coupling agents may include without limitation Suitable coupling agents may include, without limitation, 2-(1H-benzotriazol-1-yl)-1,1,3,3-tetramethyluronium hexafluorophosphate (HBTU), (benzotriazol-1-yloxy)tris(dimethylamino)phosphonium hexafluorophosphate (BOP), bis-(2-oxo-3-oxazolidinyl) phosphinic chloride (BOP-Cl), (1-cyano-2-ethoxy-2-oxoethylidenaminooxy)dimethylamino-morpholino-carbenium hexafluorophosphate (COMU™), dicyclohexylcarbodiimide (DCC), diisopropylcarbodiimide (DIC), 3-(diethoxyphosphoryloxy)-1,2,3-benzotriazin-4(3H)-one (DEPBT), N-(3-dimethylaminopropyl)-N'-ethylcarbodiimide hydrochloride (EDC), 2-(1H-7-azabenzotriazol-1-yl)-1,1,3,3-tetramethyl uronium hexafluorophosphate (HATU), O-benzotriazole-N,N,N',N'-tetramethyl-uronium-hexafluorophosphate (HBTU), 2-(6-Chloro-1H-benzotriazole-1-yl)-1,1,3,3-tetramethylaminium hexafluorophosphate (HCTU), (7-azabenzotriazol-1-yloxy)tripyrrolidinophosphonium hexafluorophosphate (PyAOP), (benzotriazol-1-yloxy) tripyrrolidinophosphonium hexafluorophosphate (PyBOP), bromotripyrrolidinophosphonium hexafluorophosphate (PyBrOP), O-(7-azabenzotriazole-1-yl)-N,N,N',N'-tetramethyluronium tetrafluoroborate (TATU), O-(benzotriazol-1-yl)-N, N,N',N'-tetramethyluronium tetrafluoroborate (TBTU), N,N,N',N'-tetramethyl-O-(3,4-dihydro-4-oxo-1,2,3-benzotriazin-3-yl) uranium tetrafluoroborate (TDBTU), 2-(5-norborene-2,3-dicarboximido)-1,1,3,3-tetramethyluronium tetrafluoroborate (TNTU), O-[(ethoxycarbonyl) cyanomethylenamino]-N,N,N',N'-tetra methyluronium tetrafluoroborate (TOTU), 2-(2-pyridon-1-yl)-1,1,3,3-tetramethyluronium tetrafluoroborate (TPTU), or N,N,N'N'-tetramethyl-O—(N-succinimidyeuronium tetrafluoroborate (TSTU).

One of ordinary skill in the art will likewise be able to select a suitable solvent without undue experimentation. Suitable solvents may include without limitation anhydrous dichloromethane, DMF, 1,4-paradioxane. And while the reagents in the reaction shown Scheme 4 are dissolved under a nitrogen atmosphere, it should be understood that any anhydrous gas may have been used including, but not limited to, nitrogen, helium, or argon, without departing from the scope of the present invention.

In these embodiments, the temperature is then reduced to about 0° C. and N,N'-diisopropylcarbodiimide (DIG) added to the solution as a coupling agent. And while the reaction shown in Scheme 4 above used DIC as a coupling agent, it should be understood that any suitable coupling agent may have been used including, but not limited to, DIC, HBTU, BOP, COMU™, DCC, DEPBT, EDC, HATU, HBTU, HCTU, PyAOP, PyBOP, PyBrOP, TATU, TBTU, TDBTU, TNTU, TOTU, TPTU, TSTU, and combinations thereof, without departing from the scope of the present invention. The resulting mixture is stirred for from about 2 hours to about 48 hours to produce the di-p-toluene sulfonic acid salt of a benzyl protected tyrosine based diester monomer XI having two benzyl-protected tyrosine residues separated by from about 2 to about 20 carbon atoms (depending upon the diol used) as shown in the first part of Scheme 4 above.

In the second part of Scheme 4 above, the p-toluene sulfonic acid protecting groups of the di-p-toluene sulfonic acid salt of the benzyl protected tyrosine based diester monomer XI are replaced with hydrochloric acid protecting groups to better facilitate quantification of the products for detection analysis. In these embodiments, the p-toluene sulfonic acid protecting groups are replaced with HCl protecting groups by reacting the di-p-toluene sulfonic acid salt of the benzyl protected tyrosine based diester monomer XI with HCl to produce the dihydrochloric acid salt of the benzyl protected tyrosine based diester monomer XII.

In some embodiments, the counter-ion protected amino acid-based diester monomers used to form the hyperbranched amino acid-based PEUs of the present invention may include, without limitation, di-p-toluenesulfonic acid salt of bis-L-leucine-octane-1,8-diester XVI, di-p-toluenesulfonic acid salt of bis-L-phenylalanine-octane-1,8-diester, or di-hydrochloric acid salt of bis-O-benzl-L-tyrosine-octane-1,8-diester.

In some embodiments, the counter-ion protected amino acid-based diester monomers used to form the hyperbranched amino acid-based PEUs of the present invention may have one the following formulas:

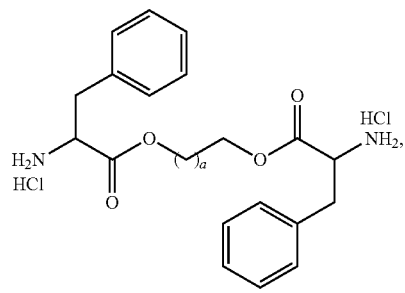
(XIII)
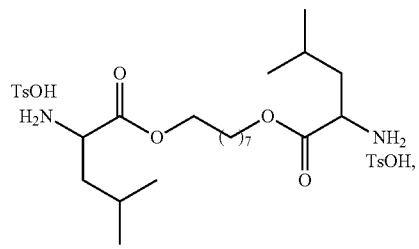
(XVI)
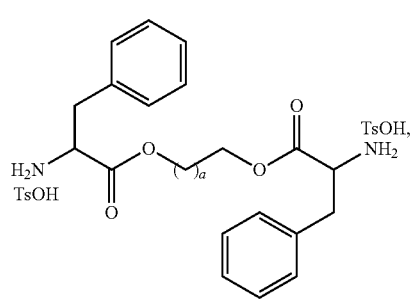
(VII)
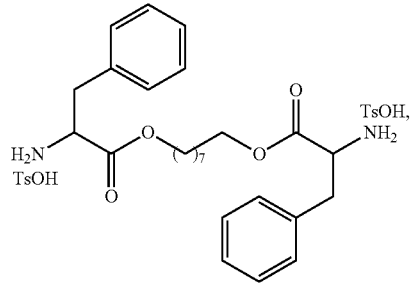
(XVII)
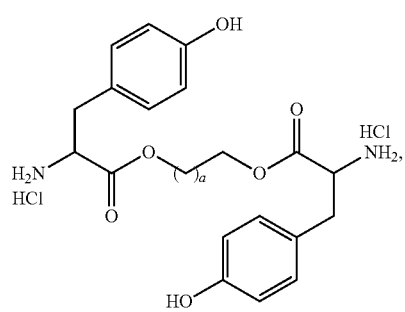
(XIV)
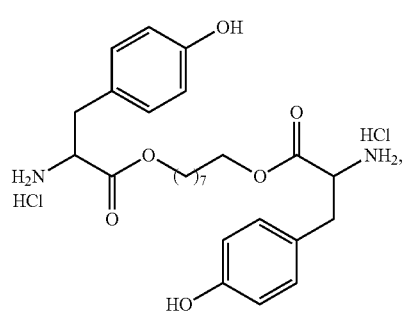
(XVIII)
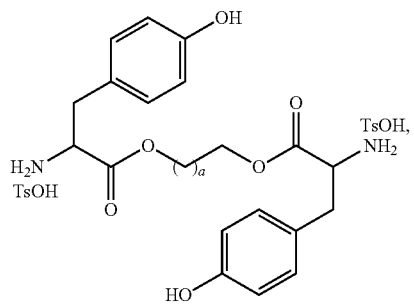
(XV)
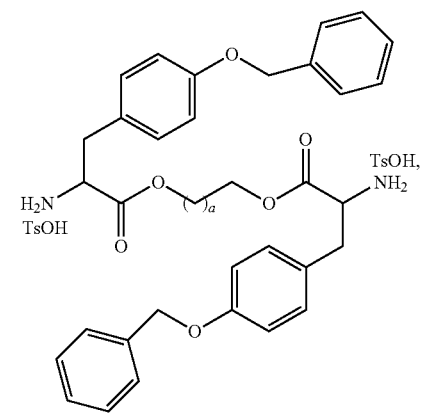
(XI)
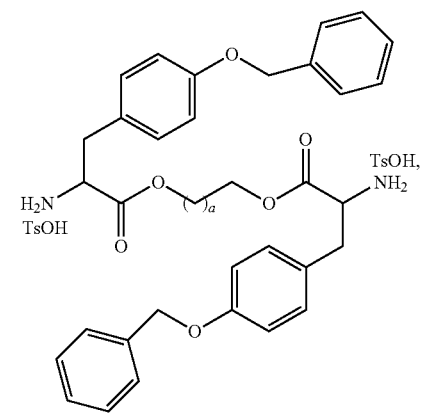
(IX)

(XII)

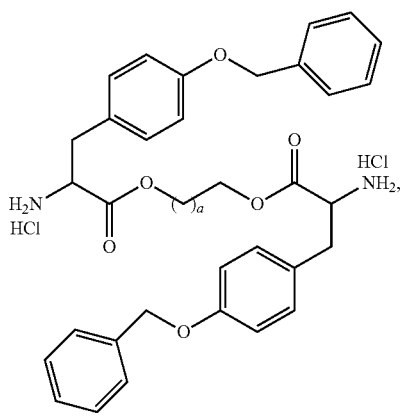

(XIX)

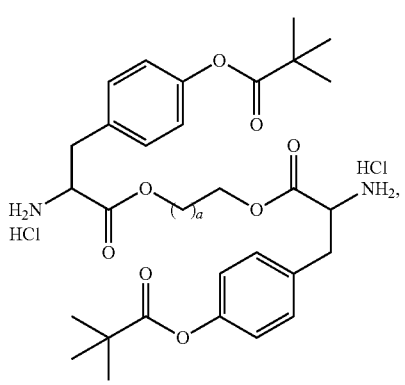

(XX)

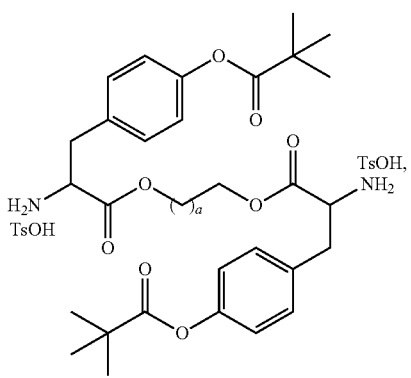

(XXI)

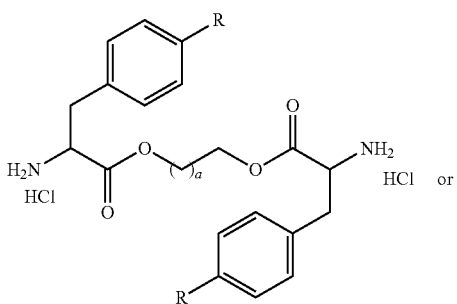

(XXII)

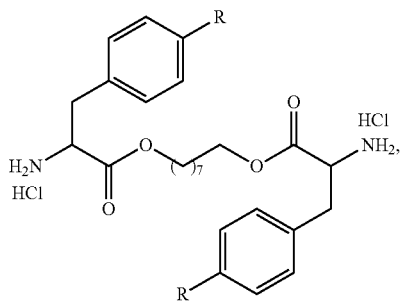

wherein a is an integer from about 1 to about 20 and R is H, OH, or —OCOO(CH$_2$)$_2$C$_6$H$_3$(OH)$_2$.

In various embodiments, the counter-ion protected branched amino acid-based polyester monomers used to form the hyperbranched amino acid-based PEUs of the present invention may be formed by reacting three or more amino acids with a branched diol and protecting the resulting branched amino acid-based polyester monomer. The amino acid or acids used to form the counter-ion protected branched amino acid-based polyester monomers used to form the hyperbranched amino acid-based PEUs of the present invention are the same as used for the counter-ion protected amino acid-based diester monomers described above and may be any α-amino acid other than proline. In some embodiments, amino acid or acids used to form the counter-ion protected branched amino acid-based polyester monomers may be alanine (ala-A); arginine (arg-R); asparagine (asn-N); aspartic acid (asp-D); cysteine (cys-C); glutamine (gln-Q); glutamic acid (glu-E); glycine (gly-G); histidine (his-H); isoleucine (ile-I); leucine (leu-L); lysine (lys-K); methionine (met-M); phenylalanine (phe-F); serine (ser-S); threonine (thr-T); tryptophan (trp-W); tyrosine (tyr-Y); valine (val-V) or any combination or derivative thereof.

In some embodiments, the counter-ion protected branched amino acid-based polyester monomer may comprise a counter-ion protected L amino acid-1,1,1-trimethyl ethane triester, wherein the amino acid is selected from the group consisting of phenylalanine, alanine, arginine, asparagine, aspartate, cysteine, glutamic acid, glutamine, glycine, proline, serine, tyrosine; isoleucine, leucine, lysine, methionine, phenylalanine, threonine, tryptophan and valine and/or combinations thereof. In some embodiments, counter-ion protected branched amino acid-based polyester monomer may be the hydrochloric acid salt of tri-o-benzyl-L-tyrosine-1,1,1-trimethyl ethane-triester.

In some embodiments, the amino acid or acids used to form the counter-ion protected branched amino acid-based polyester monomers may be a functionalized or protected α-amino acid. In some embodiments, amino acid or acids used to form the counter-ion protected branched amino acid-based polyester monomers may comprise one or more benzyl protected tyrosine molecules or tert-butyloxycarbonyl (BOC) protected tyrosine molecules.

Any suitable branched polyol having from about 4 to about 40 carbon atoms and three or more hydroxyl terminated branches may be used to synthesize the counter-ion protected branched amino acid-based polyester monomers used to form the hyperbranched amino acid-based PEUs of the present invention. Suitable branched polyols may include, without limitation, 1,1,1-tris(hydroxymethyl)propane, 1,1,1-tris(hydroxymethyl)ethane, pentaerythritol, di(trimethylolpropane)dipentaerythritol and combinations thereof.

In some embodiments, the terminal hydroxyl groups on the branched polyol are separated from each other by from about 2 to about 60 carbon atoms. In some embodiments, the terminal hydroxyl groups on the branched polyol are separated from each other by from about 2 to about 40 carbon atoms. In some embodiments, the terminal hydroxyl groups on the branched polyol are separated from each other by from about 2 to about 20 carbon atoms. In some embodiments, the terminal hydroxyl groups on the branched polyol are separated from each other by from about 2 to about 10 carbon atoms. In some embodiments, the terminal hydroxyl groups on the branched polyol are separated from each other by from about 5 to about 60 carbon atoms. In some embodiments, the terminal hydroxyl groups on the branched polyol are separated from each other by from about 15 to about 60 carbon atoms. In some embodiments, the terminal hydroxyl groups on the branched polyol are separated from each other by from about 25 to about 60 carbon atoms. In some embodiments, the terminal hydroxyl groups on the branched polyol are separated from each other by from about 35 to about 60 carbon atoms. In some embodiments, the terminal hydroxyl groups on the branched polyol are separated from each other by from about 45 to about 60 carbon atoms. In some embodiments, the terminal hydroxyl groups on the branched polyol are separated from each other by from about 5 to about 40 carbon atoms.

In some embodiments, the counter-ion protected branched amino acid-based polyester monomers are formed by first dissolving one or more selected amino acids outlined above and one or more of the branched polyols outlined above in a suitable solvent. One of ordinary skill in the art will also be able to select a suitable solvent for the selected amino acid or acids and the selected diol the without undue experimentation. Suitable solvents include without limitation, toluene, dichloromethane, chloroform, dimethylformamide (DMF) or combinations thereof. In some embodiments, the solvent used may be toluene.

Further, as with the diester monomers described above, steps should be taken to prevent transamidation of the ester bonds when forming the counter-ion protected branched amino acid-based polyester monomers. In some embodiments, transamidation may be prevented or limited by protecting the amine groups on the amino acid-based diester monomers being formed with one or more counter-ions. Accordingly, a suitable acid or other source of counter-ions may be added to the solution prior to or during formation of the diester monomer. One of ordinary skill in the art will be able to select a suitable counter-ion without undue experimentation. Materials capable of producing suitable protecting counter-ions may include without limitation, p-toluene sulfonic acid monohydrate, chlorides, bromides, acetates. trifloroacetate, or combinations thereof. In some embodiments, the acid used may be p-toluene sulfonic acid monohydrate. In some embodiments, the acid used may be HCl.

In some embodiments, the counter-ion protected branched amino acid-based polyester monomers used to form the hyperbranched amino acid-based PEUs of the present invention may be synthesized as shown in Scheme 5, below.

Scheme 5

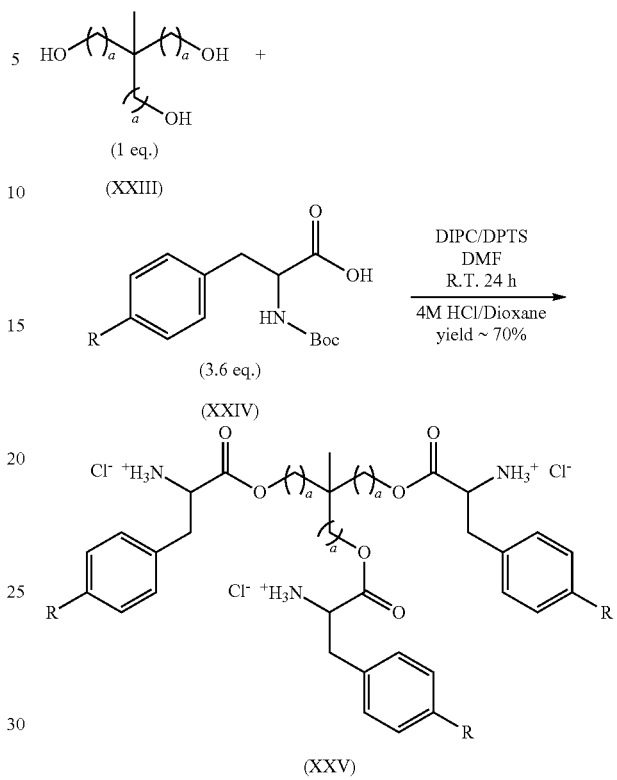

wherein a is an integer from about 2 to about 20 and R is of —CH$_3$, —(CH$_2$)$_3$NHC(NH$_2$)C═NH, —CH$_2$CONH$_2$, —CH$_2$COOH, —CH$_2$SH, —(CH$_2$)$_2$COOH, —(CH$_2$)$_2$CONH$_2$, —NH$_2$, —CH$_2$C═CH—N═CH—NH, —CH(CH$_3$)CH$_2$CH$_3$, —CH$_2$CH(CH$_3$)$_2$, —(CH$_2$)$_4$NH$_2$, —(CH$_2$)$_2$SCH$_3$, —CH$_2$Ph, —CH$_2$OH, —CH(OH)CH$_3$, —CH$_2$—C═CH—NH-Ph, —CH$_2$-Ph-OH, or —CH(CH$_3$)$_2$.

In some other embodiments where the selected amino acid is a benzyl protected tyrosine, the counter-ion protected branched amino acid-based polyester monomers used to form the hyperbranched amino acid-based PEUs of the present invention may be synthesized as shown in Scheme 6, below.

Scheme 6

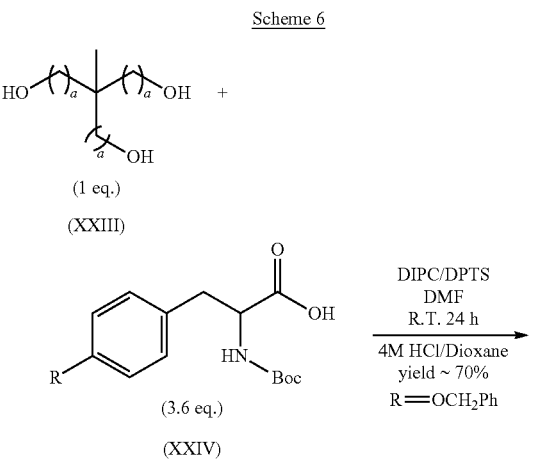

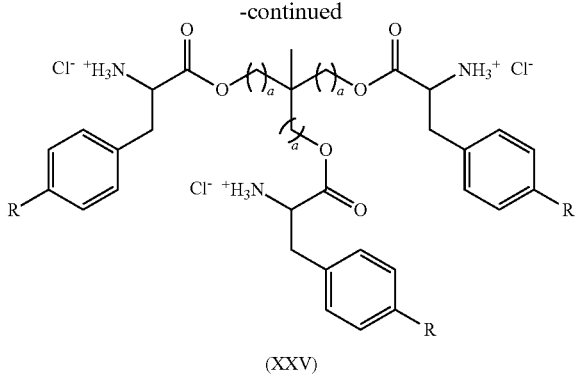

(XXV)

wherein a is an integer from about 2 to about 20.

In these embodiments, a branched polyol as described above and a suitable coupling agent such as 4-(dimethylamino)pyridinium 4-toluenesulfonate (DPTS) are first dissolved in a suitable solvent (such as anhydrous dichloromethane) under a nitrogen atmosphere and then heated to the reflux temperature of the solvent for from about 12 hours to about 48 hours. One of ordinary skill in the art will be able to select a suitable coupling agent without undue experimentation. Suitable coupling agents may include without limitation Suitable coupling agents may include, without limitation, 2-(1H-benzotriazol-1-yl)-1,1,2,2-terramerhyluronium hexafluorophosphate (HBTU), (benzotriazol-1-yloxy)tris(dimethylamino)phosphonium hexafluorophosphate (BOP), bis-(2-oxo-3-oxazolidinyl)phosphinic chloride (BOP-Cl), (1-cyano-2-ethoxy-2-oxoethylidenaminooxy)dimethylamino-morpholino-carbenium hexafluorophosphate (COMU™), dicyclohexylcarbodiimide (DCC), diisopropylcarbodiimide (DIC), 3-(diethoxyphosphoryloxy)-1,2,3-benzotriazin-4(3H)-one (DEPBT), N-(3-dimethylaminopropyl)-N'-ethylcarbodiimide hydrochloride (EDC), 2-(1H-7-azabenzotriazol-1-yl)-1,1,3,3-tetramethyl uronium hexafluorophosphate (HATU), O-benzotriazole-N,N,N',N'-tetramethyl-uronium-hexafluoro-phosphate (HBTU), 2-(6-Chloro-1H-benzotriazole-1-yl)-1,1,3,3-tetramethylaminium hexafluorophosphate (HCTU), (7-azabenzotriazol-1-yloxy)tripyrrolidinophosphonium hexafluorophosphate (PyAOP), (benzotriazol-1-yloxy)tripyrrolidinophosphonium hexafluorophosphate (PyBOP), bromotripyrrolidinophosphonium hexafluorophosphate (PyBrOP), O-(7-azabenzotriazole-1-yl)-N,N,N',N'-tetramethyluronium tetrafluoroborate (TATU), O-(benzotriazol-1-yl)-N,N,N',N'-tetramethyluronium tetrafluoroborate (TBTU), N,N,N',N'-tetramethyl-O-(3,4-dihydro-4-oxo-1,2,3-benzotriazin-3-yl) uranium tetrafluoroborate (TDBTU), 2-(5-norborene-2,3-dicarboximido)-1,1,3,3-tetramethyluronium tetrafluoroborate (TNTU), O-[(ethoxycarbonyl)cyanomethylenamino]-N,N,N',N'-tetra methyluronium tetrafluoroborate (TOTU), 2-(2-pyridon-1-yl)-1,1,3,3-tetramethyluronium tetrafluoroborate (TPTU), or N,N,N'N'-tetramethyl-O—(N-succinimidyeuronium tetrafluoroborate (TSTU).

One of ordinary skill in the art will likewise be able to select a suitable solvent without undue experimentation. Suitable solvents may include without limitation anhydrous dichloromethane, DMF, 1,4-paradioxane. And while the reagents in the reaction shown Scheme 4 are dissolved under a nitrogen atmosphere, it should be understood that any anhydrous gas may have been used including, but not limited to, nitrogen, helium, or argon, without departing from the scope of the present invention.

In these embodiments, the temperature is then reduced to about 0° C. and 1,3-diisopropyl carbodiimide (DPIC) added to the solution as a coupling agent. And while the reaction shown in Scheme 6 above used DPIC as a coupling agent, it should be understood that any suitable coupling agent may have been used including, but not limited to DIC, HBTU, BOP, COMU™, DCC, DEPBT, EDC, HATU, HBTU, HCTU, PyAOP, PyBOP, PyBrOP, TATU, TBTU, TDBTU, TNTU, TOTU, TPTU, TSTU, and combinations thereof, without departing from the scope of the present invention. The resulting mixture is stirred for from about 2 hours to about 48 hours to produce the branched polyester monomer, as shown in Scheme 6 above. In some embodiments, the counter-ion protected branched amino acid-based polyester monomers used to form the hyperbranched amino acid-based PEUs of the present invention may be synthesized as shown in Example 6, below.

The crude product of the reactions described above may be purified using any means known in the art for that purpose, including, without limitation, filtration, crystallization, or column chromatography. One or ordinary skill in the art would know how to purify these products without undue experimentation. In some embodiments, the crude reaction product may be purified by first vacuum filtering to remove the residual solvent and then decolorized in activated carbon to remove any residual salts or unreacted monomers. In some embodiments, the crude reaction product may then be recrystallized from boiling water from 1 to 10 times to produce a purified product. In some embodiments, the crude product may be recrystallized from a 1:1 mixture of water and alcohol from 1 to 10 times to produce a purified product. In some embodiments, after cooling to ambient temperature, the crude product may be filtered, washed with diethyl ether and then recrystallized with water. In some embodiments, the crude product may be filtered, washed with diethyl ether, and collected by vacuum filtration. In some embodiments, the crude product was filtered, concentrated and dissolved in $CHCl_3$, washed with 5% HCl twice, brine once, dried over $Na_2SO_4$ and the solvent removed in vaccuo to produce the purified product. In some embodiments, the crude product may be dissolved in chloroform, washed with sodium bicarbonate solution three times, an then collected and concentrated for chromatography purification on silica gel.

In a second step, the hyperbranched amino acid-based PEUs according to one or more embodiments of the present invention are formed by interfacial polymerization of the counter-ion protected amino-acid-based polyester monomers discussed above and a PEU forming material such as phosgene, diphosgene or triphosgene. As used herein, the term "interfacial polymerization" refers to polymerization that takes place at or near the interfacial boundary of two immiscible fluids. In some embodiments, the interfacial polymerization reaction is a polycondensation reaction.

In these embodiments, the counter-ion protected amino acid-based polyester monomers discussed above are combined in a desired molar ratio with a first fraction of a suitable organic water soluble base such as sodium carbonate, potassium carbonate, sodium bicarbonate, or potassium bicarbonate and dissolved in water. One of ordinary skill in the art will be able to dissolve the counter-ion protected amino acid-based polyester monomers and organic water soluble base in water without undue experimentation. In some embodiments, the counter-ion protected amino acid-based polyester monomers and organic water soluble base may be dissolved in water using mechanical stirring and a warm water bath (approximately 35° C.).

To introduce the urea bond to the amino acid functionalized monomer or monomers, a PEU forming material is employed. As used herein, the terms "PEU forming compound" and "PEU forming material" are used interchangeably to refer to a material capable of placing a carboxyl group between two amine groups, thereby forming a urea bond. Suitable PEU forming material may include, without limitation, triphosgene, diphosgene, or phosgene. It should be noted that, diphosgene (a liquid) and triphosgene (a solid crystal) are understood to be more suitable than phosgene, as they are generally known as safer substitutes for phosgene, which is a toxic gas. The reaction of the counter-ion protected amino acid-based polyester monomer or monomers with triphosgene, diphosgene or phosgene to create an amino acid-based PEU may be achieved as described below (See Example 7) or in any number of ways generally known to those of skill in the art.

In various embodiments of the present invention, the hyperbranched amino acid-based PEUs described above are biodegradable. As used herein, the terms "degradable," and "biodegradable" are used interchangeably to refer to a macromolecule or other polymeric substance susceptible to degradation by biological activity by lowering the molecular masses of the macromolecules that form the substance. The degradation properties of hyperbranched amino acid-based PEUs according to various embodiments of the present invention will depend upon such things as the molecular weight of the PEU, the size structure and distribution of the linear amino acid based diester monomer segments and branched amino acid-based polyester monomer segments, and the particular amino acid residue(s) present. By manipulating these variables, the degradation properties of the hyperbranched amino acid-based PEUs of the present invention may be tuned to obtain a wide variety degradation profiles and other characteristics and may be tuned for specific applications.

In another aspect of the present invention, hyperbranched amino acid-based PEUs described above can be formed into fibers. The hyperbranched amino acid-based PEUs may be formed into fibers by any method known in the art for that purpose, including, without limitation, electrospinning, melt blowing, blow spinning, centrifugal spinning, Rotary Jet Spinning (RJS), Gas Jet Fibers (GJF), Nanofibers by Gas Jet (NGJ) (see e.g. U.S. Pat. Nos. 6,382,526, 6,520,425, and 6,695,992, which are incorporated herein by reference in their entirety), three-dimensional printing, extrusion, and combinations thereof, provided that the polymer is not heated beyond its $T_d$.

Unexpectedly, the hyperbranched PEUs nanofibers have been found to be sterilizable with ethyl oxide (ETO) and stable for long periods of ETO sterilization, elevated temperature and exposure to aqueous environments. In one or more embodiments, fibers made from the hyperbranched amino acid-based PEU polymers of various embodiments of the present invention can be sterilized using ethyloxide (ETO) sterilization without significant degradation or loss of function. As used herein, "significant degradation" would be more than 10% degradation by weight. In one or more embodiments, fibers made from the hyperbranched amino acid-based PEU polymers of various embodiments of the present invention can be sterilized using ethyloxide (ETO) sterilization with less than 5% degradation of the hyperbranched amino acid-based PEU polymer forming the fibers. In one or more embodiments, fibers made from the hyperbranched amino acid-based PEU polymers of various embodiments of the present invention can be sterilized using ethyloxide (ETO) sterilization with less than 3% degradation of the hyperbranched amino acid-based PEU polymer forming the fibers. In one or more embodiments, fibers made from the hyperbranched amino acid-based PEU polymers of various embodiments of the present invention can be sterilized using ethyloxide (ETO) sterilization with less than 1% degradation of the hyperbranched amino acid-based PEU polymer forming the fibers.

Experimental

In order to better define and reduce to practice the hyperbranched poly(ester urea)s (PEUs) of the present invention, a series of amino-acid based PEUs with controlled amounts of branching were synthesized and characterized. The mechanical properties, thermal characteristics and water adsorption properties were found to vary widely with the extent of branch unit incorporation. In particular, a linear bis-L-phenylalanine-hexane-1,6-diester monomer, a branch tri-O-benzyl-L-tyrosine-1,1,1-trimethyl ethane-triester monomer and a series of copolymers were synthesized and described. The extent of branching was varied by adjusting the molar ratio of linear to branched monomer during the interfacial polymerization. The elastic moduli spanned a range of values (1.0-3.1 GPa) that overlaps with several clinically available degradable polymers. Increasing the amount of branching monomers was found to reduce the molecular entanglement, which resulted in a decrease in elastic modulus values and an increase in values of elongation at break. The L-phenylalanine-based poly(ester urea)s also exhibited a branch density dependent water uptake ability that varied between 2-3% after 24 h immersion in water. Nanofibers incorporating PEUs with 8% branching were found to be able to maintain their morphology at elevated temperature, in hydrated conditions, and during ethylene oxide sterilization. which are all critical to efforts to translate these materials to clinical soft tissue applications.

Monomer and Polymer Synthesis

Figure 1B:
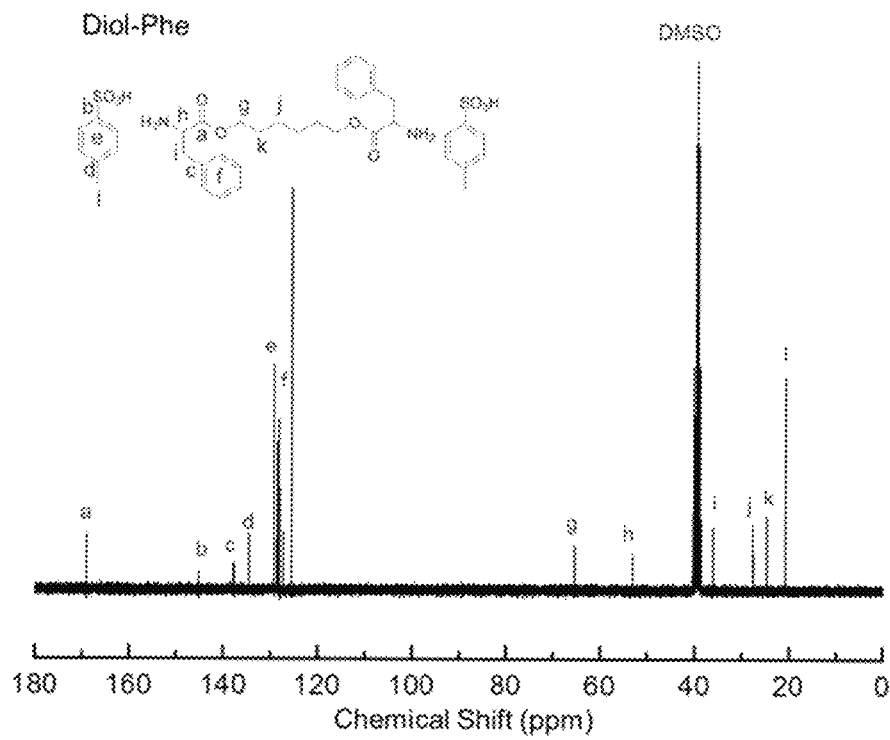
Figure 2A:
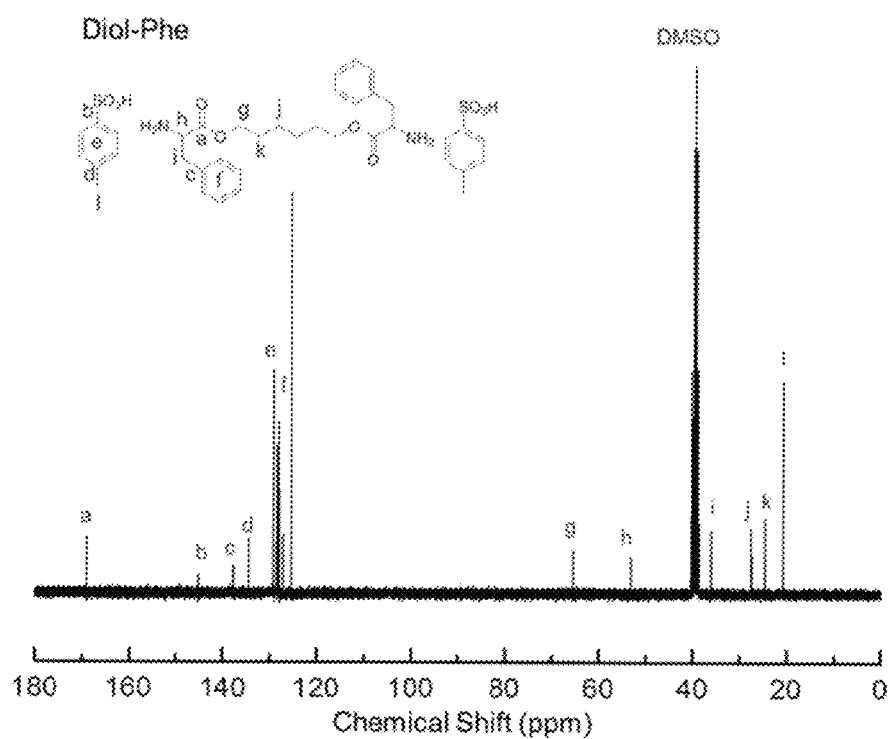
FIG. 2A-B are $^{13}$C Nuclear Magnetic Resonance Spectroscopy ($^{13}$C NMR) (DMSO-d6) spectra of di-p-toluene sulfonic acid salts of bis-L-phenylalanine-hexane-1,6-diester monomer (Diol-PHE) (FIG. 2A) and hydrochloric acid salts of tri-O-benzyl-L-tyrosine-1,1,1-trimethyl ethane-triester monomer (Triol-TYR) (FIG. 2B).
Figure 2B:
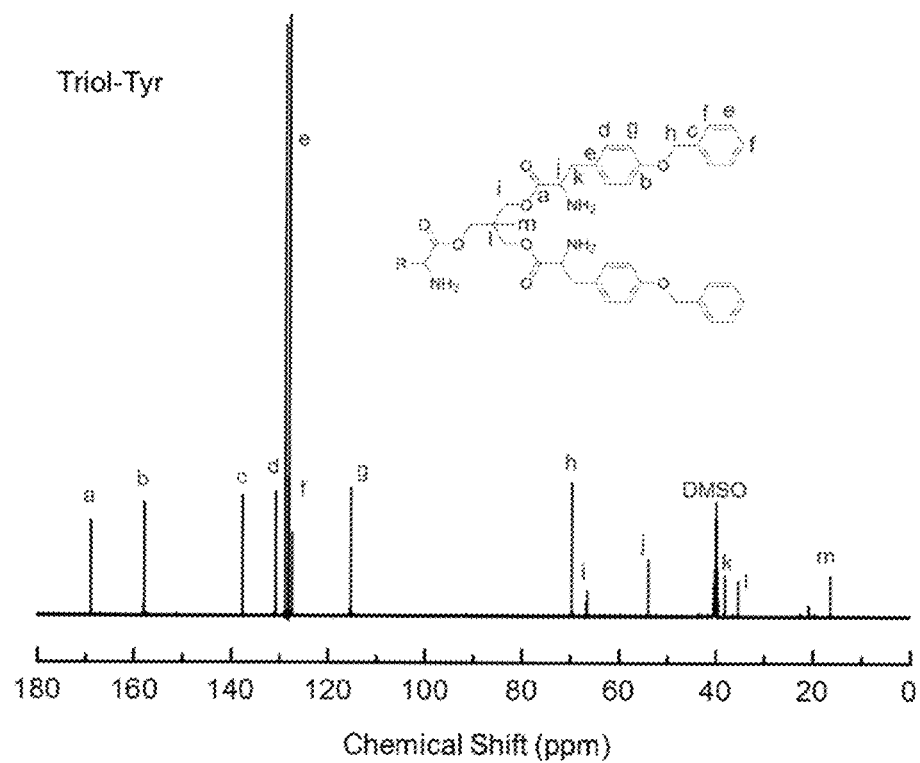

Two monomers were synthesized and characterized with $^1$H NMR (FIG. 1A-B) and $^{13}$C NMR (FIG. 2A-B). The characteristic resonances of each spectrum demonstrate that each monomer was successfully synthesized. FIG. 1A shows the spectrum of linear PEU monomer (Diol-PHE). For the benzyl-protected tyrosine branched monomer (Triol-TYR) in FIG. 1B, the aromatic hydrogens of tyrosine have chemical shifts in the range of 6.89 ppm-7.42 ppm, which possess different patterns from those of phenylalanine located between 7.09 ppm to 7.50 ppm. The singlet at 5.03 ppm and 0.86 ppm are assigned to the benzyl methylene from benzyl protected tyrosine and methyl group from the triol respectively. The disappearance of the protons corresponding to the methyl groups in the Boc protecting group at 1.31 ppm and the appearance of resonance associated with the amine group at 8.72 ppm confirms the deprotection process. Both the integration values of individual spectrum (FIG. 1A-B) and the ESI results (FIGS. 3, 4) show that the monomers are fully functionalized. The FTIR of the monomers (FIG. 5) also confirmed the formation of the ester bond. Both monomers were stored as the quantitative amine salt and the free amine was generated in situ using sodium carbonate at the beginning of the polymerization.

Figure 6:
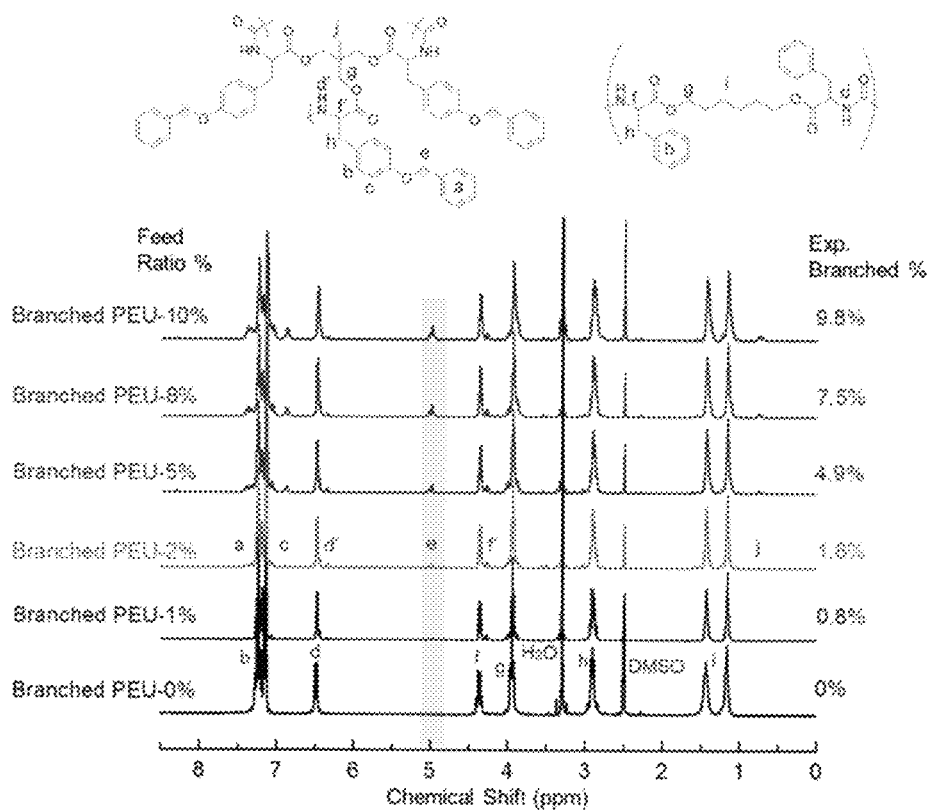
FIG. 6 is a comparison of the $^1$H NMR (DMSO-d$_6$) spectra of branched poly(ester urea)s according to one or more embodiments of the present invention. (Branched PEU-0%, Branched PEU-1%, Branched PEU-2%, Branched PEU-5%, Branched PEU-8%, Branched PEU-10%)
Figure 7:
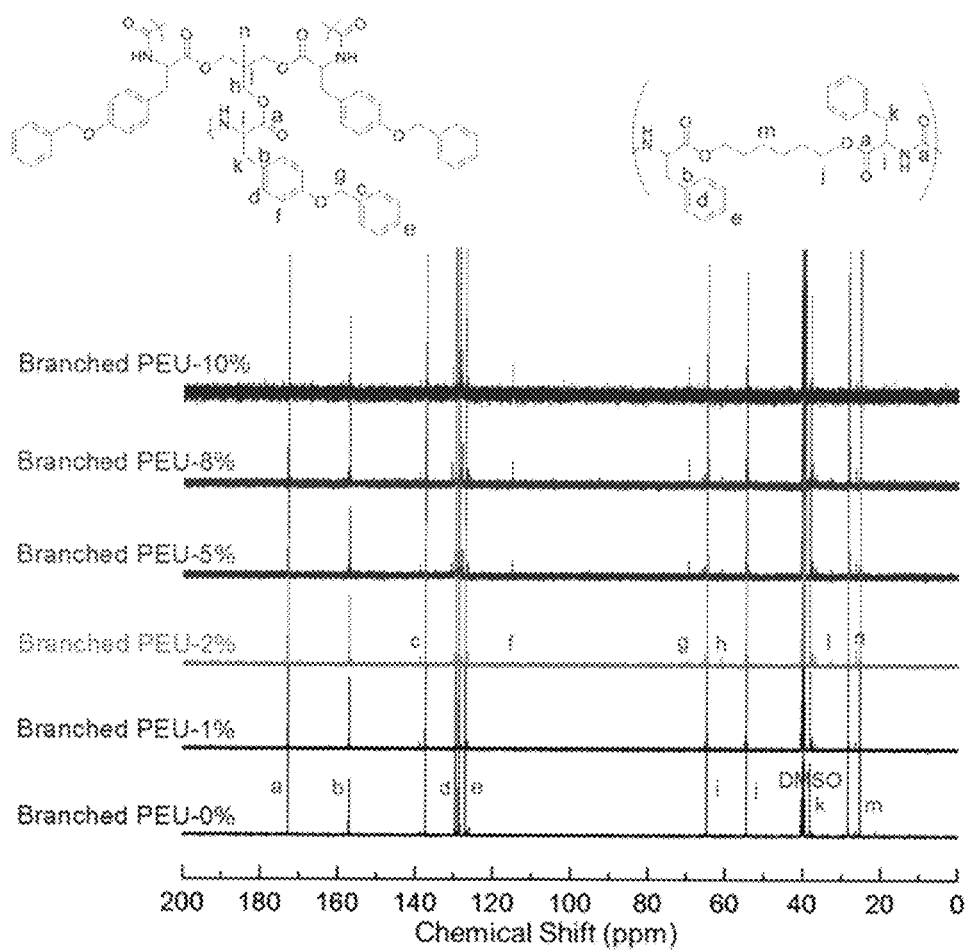
FIG. 7 is a graphic comparison of $^{13}$C NMR (DMSO-d$_6$) spectra for branched poly(ester urea)s according to one or more embodiments of the present invention including, Branched PEU-0%, Branched PEU-1%, Branched PEU-2%, Branched PEU-5%, Branched PEU-8%, and Branched PEU-10%.
Figure 8:
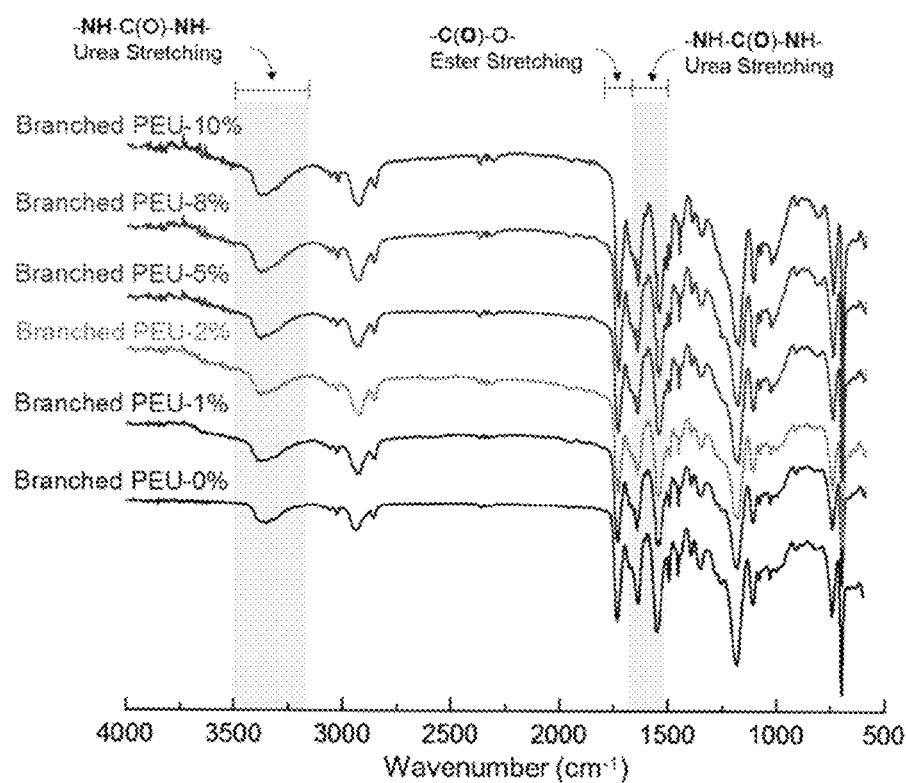
FIG. 8 is a comparison of Fourier Transform Infrared Spectroscopy (FTIR) traces of branched poly(ester urea)s according to one or more embodiments of the present invention. (Branched PEU-0%, Branched PEU-1%, Branched PEU-2%, Branched PEU-5%, Branched PEU-8%, Branched PEU-10%).

Random copolymerization using defined feed ratios of linear monomer, (Diol-PHE), and branched monomer, (Triol-TYR), yielded a series of poly(ester urea)s with different branch densities by interfacial polymerization (See Scheme 1, above). The degree of branching was controlled by the feed ratio of the linear monomer Diol-PHE to the branched monomer Tirol-TYR. The chemical structures were characterized by $^1$H NMR (FIG. 6), $^{13}$C NMR (FIG. 7) and FTIR spectroscopy (FIG. 8). All of the peaks are assigned and the characteristic resonances of each $^1$H NMR spectrum show that each of the polymers was successfully synthesized. The spectra of Branched PEU-0%, Branched PEU-1%, Branched PEU-2%, Branched PEU-5%, Branched PEU-8% and Branched PEU-10%, they all possess similar chemical shifts except the additional peaks at 0.72 ppm-0.76 ppm, 4.26 ppm-4.29 ppm, 4.99 ppm-5.02 ppm, 6.33 ppm-6.35 ppm, 6.86-7.08 ppm and 7.33 ppm-7.42 ppm which corresponds to the signals of the branched monomer Triol-Tyr. The experimentally determined values for the degree of branching can be calculated from the ratio of the following two integration values: the peaks at 4.99 ppm-5.02 ppm which corresponds to the six benzyl methylene protons from one branched monomer Triol-TYR divided by 6 and the peaks at 1.15 ppm-1.43 ppm which represents the eight methylene protons from one linear monomer Diol-PHE divided by 8. The experimental results are listed in Table 1 and show values that are close to the original feed ratios, further confirming the successful incorporation of the branched monomers in the polymers.

branched polymers. The molecular masses of all polymers are sufficiently high for compression molding. All of these polymers are soluble in polar organic solvents, including DMF, dimethyl sulfoxide (DMSO), N-methyl-2-pyrrolidone (NMP) and HFIP. This solubility properties enable a number of solution processing methods such as solution casting, spin coating and electrospinning.

Thermal Properties

Figure 9:
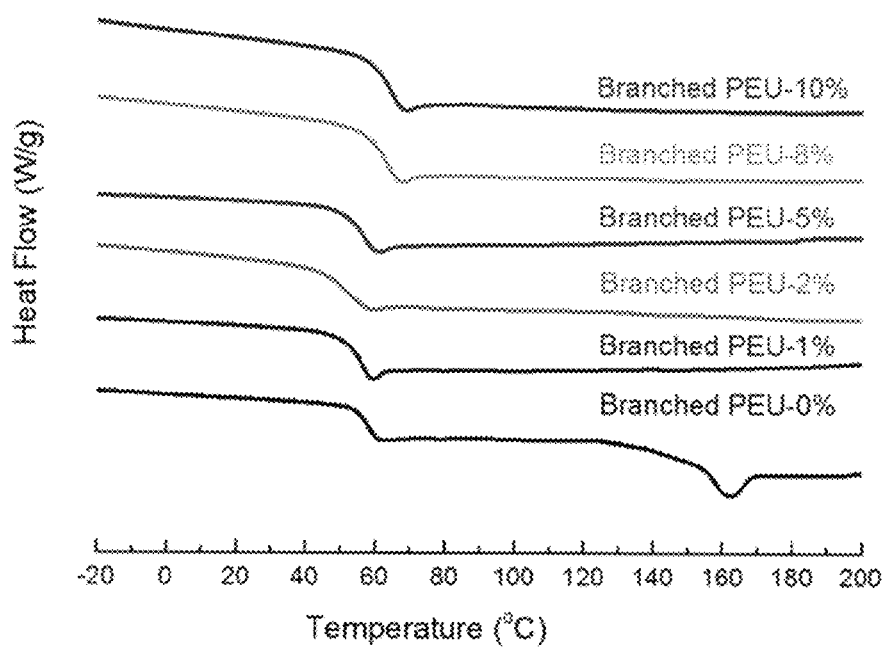
FIG. 9 is a comparison of Differential Scanning Calorimetry (DSC) curves of branched poly(ester urea)s according to one or more embodiments of the present invention. (Branched PEU-0%, Branched PEU-1%, Branched PEU-2%, Branched PEU-5%, Branched PEU-8%, Branched PEU-10%).
Figure 17:
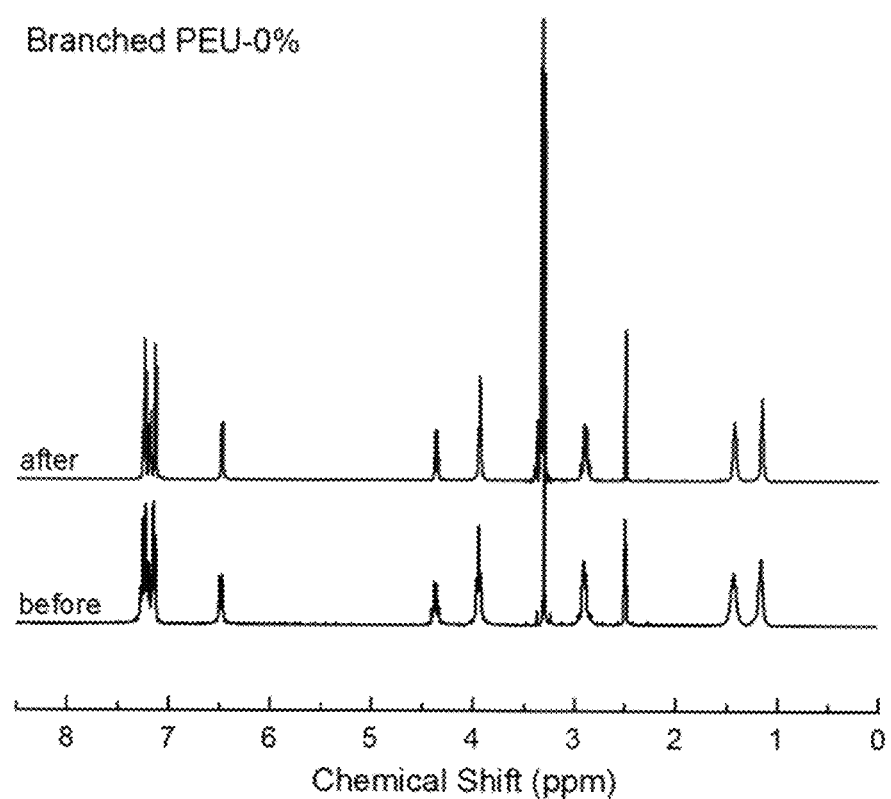
FIG. 17 is a graphic comparison of $^1$H NMR (DMSO-$d_6$) spectra for Branched PEU-0% before and after compression molding. The $^1$H NMR results before and after the compression molding were identical, which confirms the materials survive thermal processing.

Thermogravimetric Analysis (TGA) results (Table) showed that the onset degradation temperatures $T_d$ of the branched poly(ester urea)s are all above 285° C. with subtle differences due to the different amounts of branched monomer incorporated into the copolymer. These PEU polymers possess high thermal stability and their $T_d$ are significantly higher than the glass transition temperature, $T_g$. (FIG. 9), which means that these materials can be melt processed with limited thermal degradation processes. The $^1$H NMR and SEC results before and after the compression molding were identical, which confirms the materials survive thermal processing (See, FIGS. 5 and 17 and Table 2).

TABLE 1

Characterization data summary of branched poly(ester urea)s with different branch density.

| Samples | Feed Ratio | Experimental Ratio | $M_w^a$ | $D_M^a$ | $M_w^b$ | $T_d$/° C. | $T_g$/° C. |
|---|---|---|---|---|---|---|---|
| Branched PEU-0% | 0% | 0% | 117k | 1.94 | 68k | 286 | 54 |
| Branched PEU-1% | 1% | 0.8% | 65k | 2.19 | 33k | 292 | 57 |
| Branched PEU-2% | 2% | 1.8% | 79k | 2.53 | 45k | 301 | 56 |
| Branched PEU-5% | 5% | 4.9% | 74k | 2.96 | 38k | 305 | 62 |
| Branched PEU-8% | 8% | 7.5% | 108k | 5.31 | 159k | 309 | 62 |
| Branched PEU-10% | 10% | 9.8% | 110k | 7.02 | —$^c$ | 298 | 63 |

$^a$results from SEC with RI detector from PS standards
$^b$results from SEC with dual angle light scattering detector (15° and 90°) from a single narrow molecular weight PMMA standard
$^c$polymer does not dissolve well In the FTIR spectra for hyperbranched amino-acid based PEUs according embodiments of the present invention containing 0%, 1%, 2%, 5%, 8%, and 10% branched monomer (See FIG. 8), the peaks at 1735-1750 cm$^{-1}$ correspond to the carbonyl (C=O ester) stretches, which confirms the presence of the ester bond. The C—H (aromatic) stretching at 3000-3100 cm$^{-1}$, aromatic (C=C aromatic) stretch at 1450-1600 cm$^{-1}$ and C—H (aromatic) bending at 750 cm$^{-1}$ show the presence of the aromatic L-phenylalanine and L-tyrosine in the polymer. The strong band at 1000-1300 cm' arises from the C—O (ester) stretch and C—H bending vibration. The peaks at 1650-1690 cm$^{-1}$ are the C=O (urea) stretching peak, which confirms the presence of the urea bond. The peak at 3350-3500 cm$^{-1}$ is the N—H (urea) stretching peak. All these characteristic signals demonstrate the successful synthesis of the polymers.

The respective molecular masses and post-precipitation molecular mass distributions are listed in Table 1. The polymers are obtained through a step growth polymerization process, which means that the molecular mass distribution should be around 2. However, the reported molecular mass distribution of Branch PEU-0% is 1.94, narrower than the theoretical value for step growth polymerizations. This is because it is a post-precipitation molecular weight and fractionation occurs during precipitation. For the other branched PEUs, they possess higher polydispersity of molecular masses, which is consistent with the properties of

TABLE 2

SEC results before and after compression molding.

| Samples | $M_w$ | $D_M$ |
|---|---|---|
| Branched PEU-0% before compression molding | 117 kDa | 1.94 |
| Branched PEU-0% after compression molding | 114 kDa | 2.01 |

The DSC results (See Table 1 and FIG. 9) showed that the glass transition temperature, $T_g$, increases slightly with the low level of branched monomer incorporation. It is believed that the branched monomer provides less flexibility which lowers the concentrations of the flexible diol in the backbone and possesses large benzyl side groups in the branched monomer which can hinder the movement of the backbone chains. These result in the increase in $T_g$.

Mechanical Properties.

Figure 10:
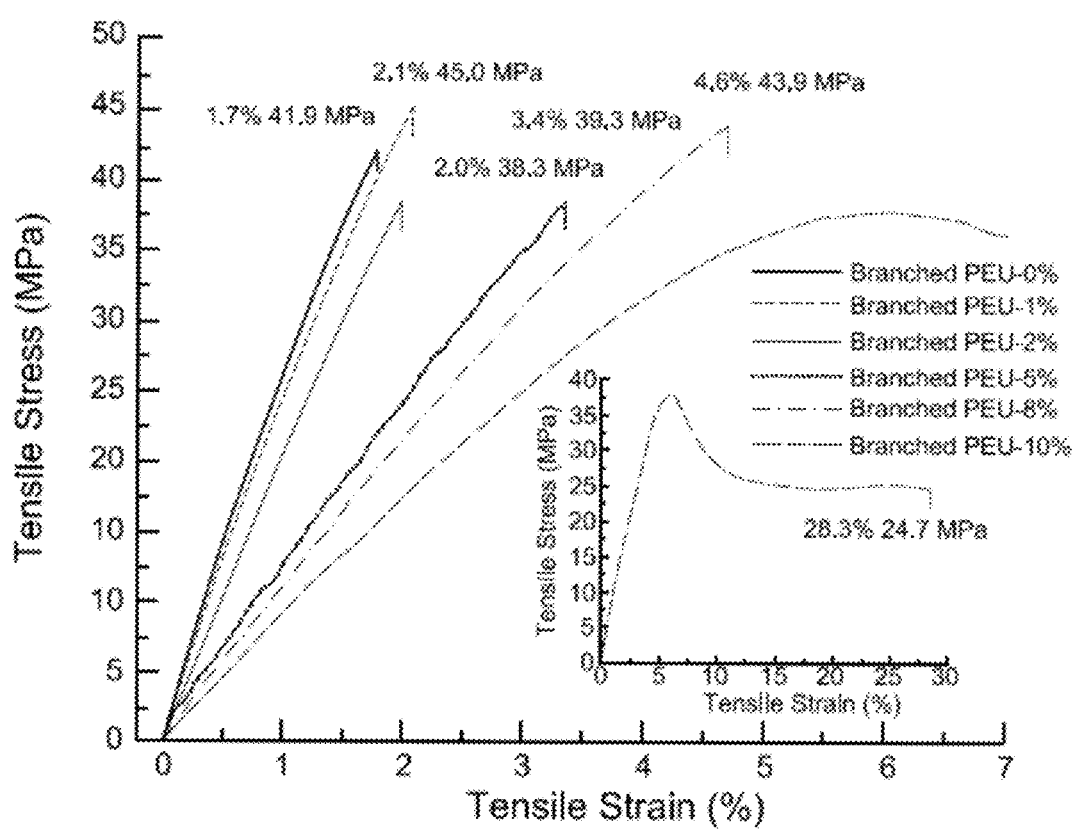
FIG. 10 is a comparison of stress-strain curves for branched poly(ester urea)s according to one or more embodiments of the present invention measured by Instron 5543 at room temperature (25±1° C.) with dumbbell-shaped samples with the crosshead speed of 3 mm/min. (Branched PEU-0%, Branched PEU-1%, Branched PEU-2%, Branched PEU-5%, Branched PEU-8%, Branched PEU-10%) The elastic moduli were calculated using the slope of linear fitting of the data from strain 0% to 0.1%. The scale modified plot of Branched PEU-10% is shown inside.
Figure 11A:
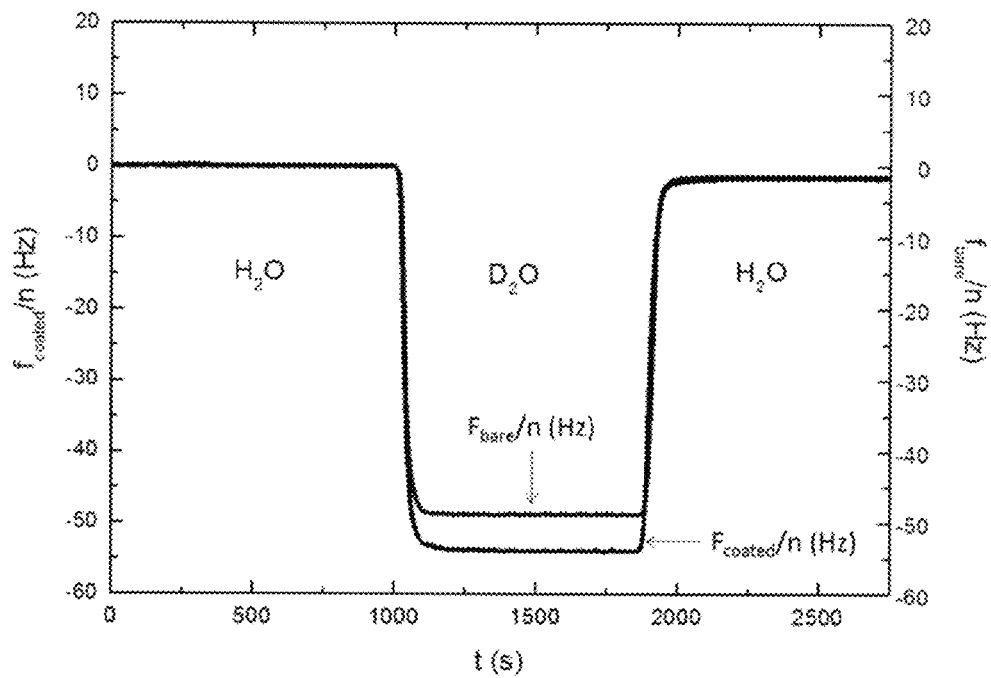
FIG. 11A-F are graphs showing water uptake data collected using a solvent exchange approach via Quartz Crystal Microbalance (QCM) for Branched PEU-0% (FIG. 11A), Branched PEU-1% (FIG. 11B), Branched PEU-2% (FIG. 11C), Branched PEU-5% (FIG. 11D), Branched PEU-8% (FIG. 11E), Branched PEU-10% (FIG. 11F) according to one or more embodiments of the present invention. The differences in the scaled frequency changes between the bare crystals and the film-coated crystals were used for the determination of the water content.
Figure 11B:
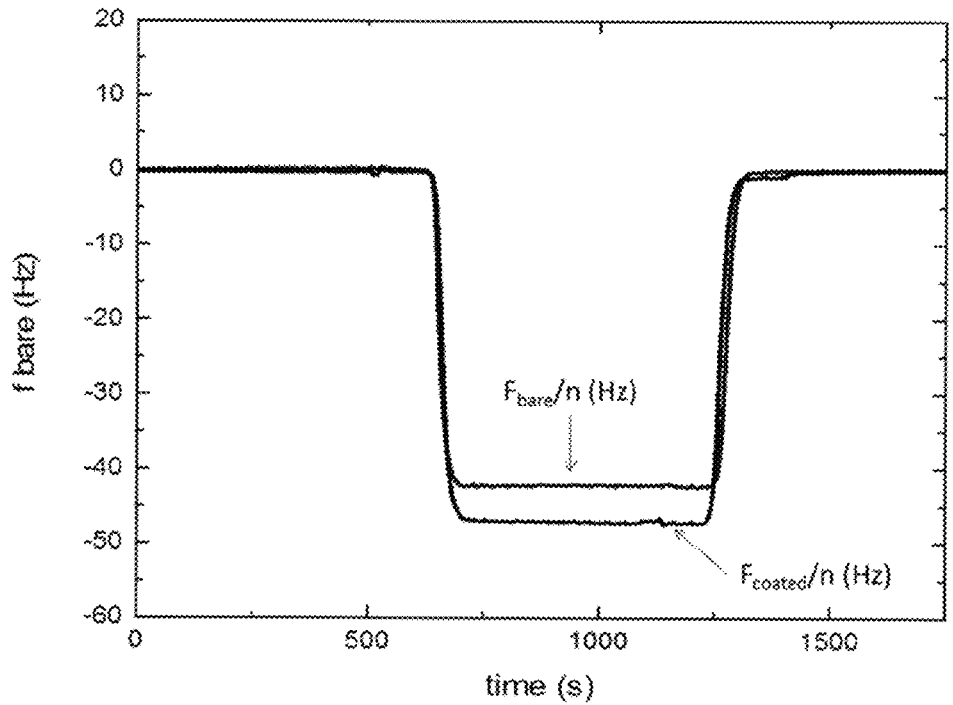
Figure 11C:
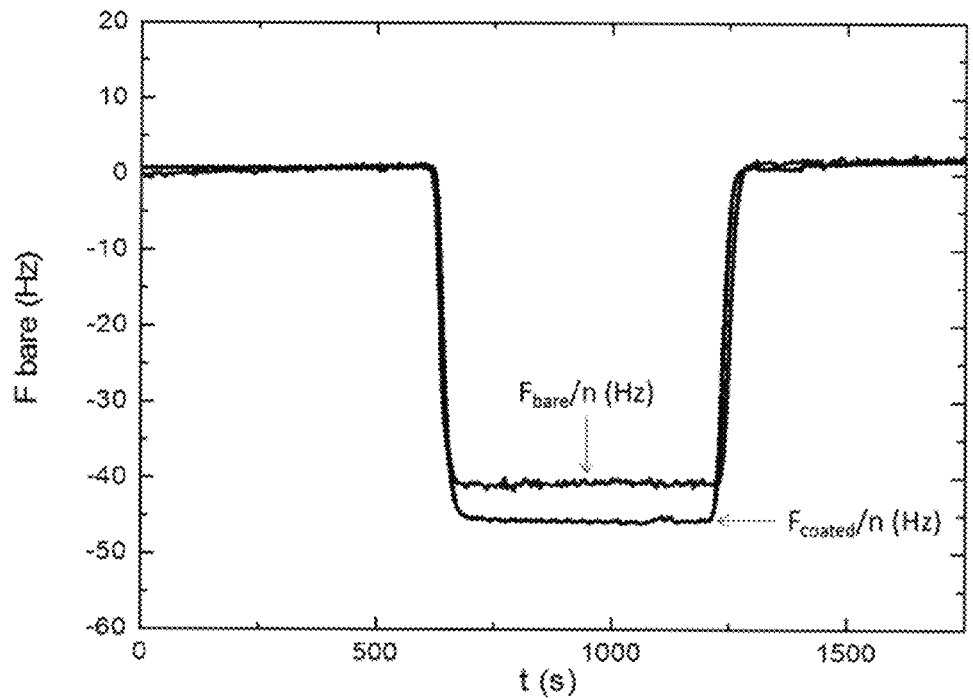
Figure 11D:
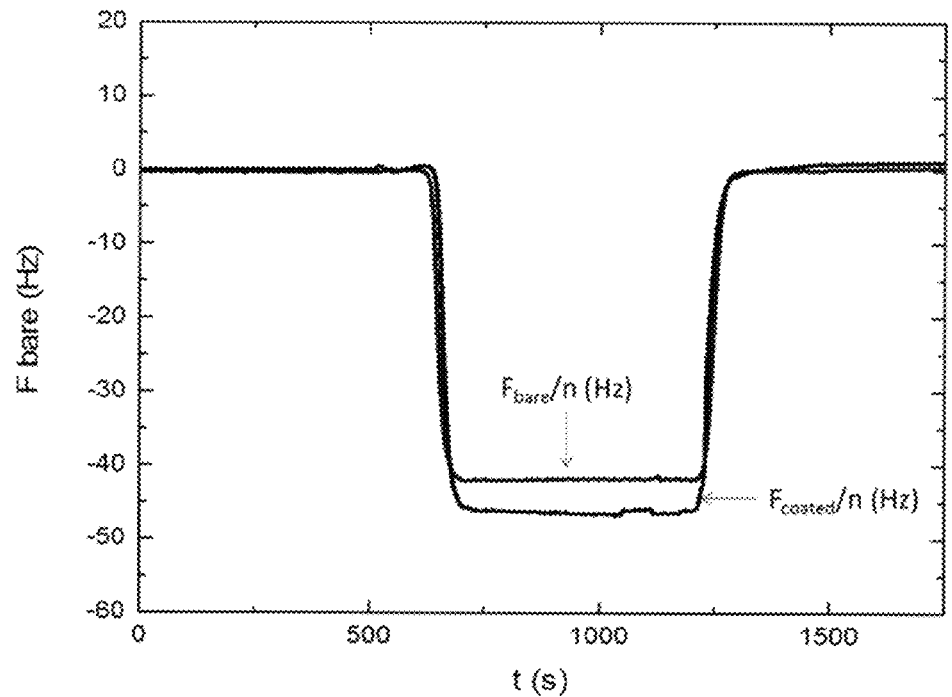
Figure 11E:
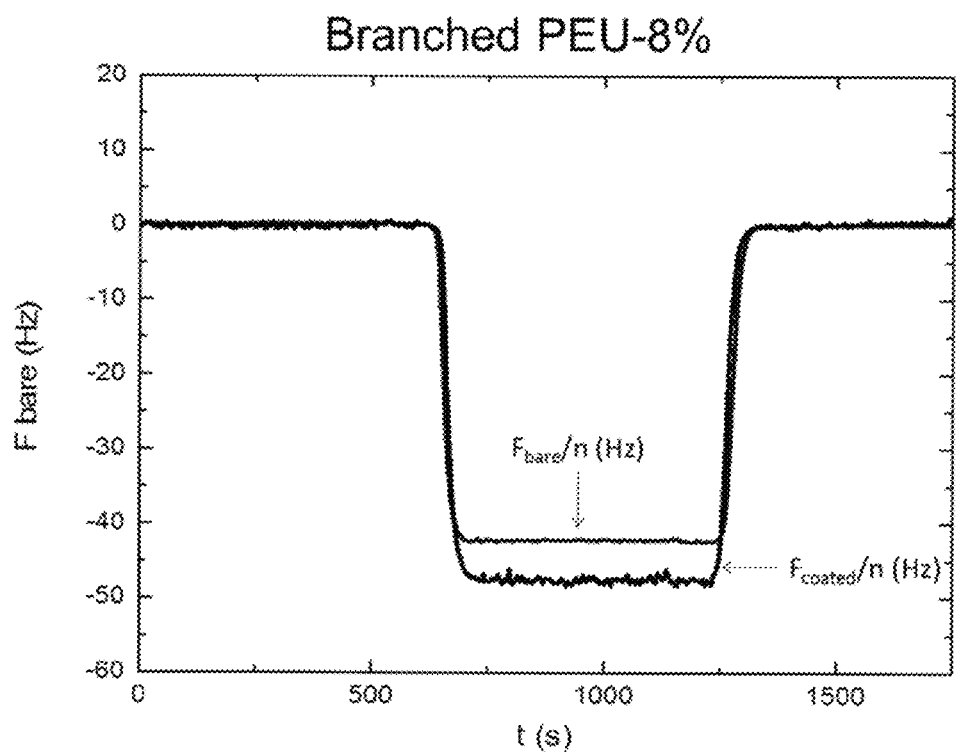
Figure 11F:
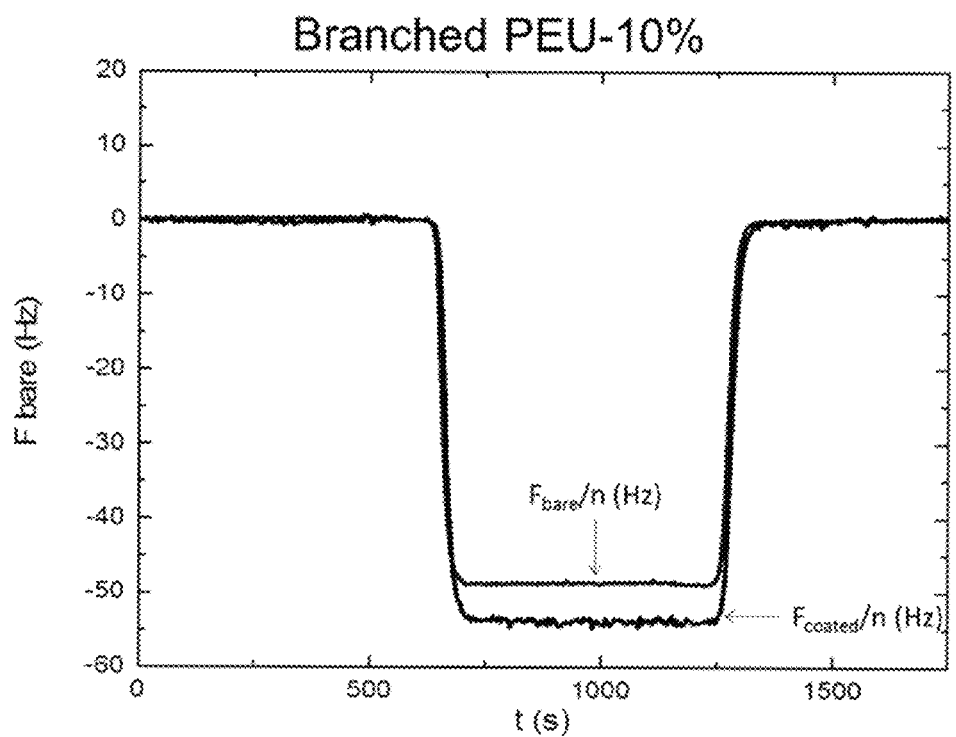

The elastic modulus, strain at break, and stress at break of branched poly(ester urea)s were all characterized by tensile tests at room temperature. The results are reported in Table 3 and shown in FIG. 10.

TABLE 3

Mechanical properties of branched poly(ester urea)s with different branch density.

| Polymer | E'/GPa | Strain at break/%* | Stress at break/MPa* |
|---|---|---|---|
| Branched PEU-0% | 3.1 ± 0.1 | 1.7 ± 0.4 | 41.9 ± 4.3 |
| Branched PEU-1% | 2.7 ± 0.1 | 2.1 ± 0.3 | 45.0 ± 3.0 |
| Branched PEU-2% | 1.9 ± 0.1 | 2.0 ± 0.2 | 38.3 ± 3.5 |
| Branched PEU-5% | 1.3 ± 0.1 | 3.4 ± 0.8 | 39.3 ± 8.7 |
| Branched PEU-8% | 1.2 ± 0.1 | 4.6 ± 0.9 | 43.9 ± 2.0 |
| Branched PEU-10% | 1.0 ± 0.1 | 28.3 ± 1.6 | 24.7 ± 7.3 |

*The reported results were the average values of three individual measurements.

The linear fit of the respective stress-strain curve values (0% to 0.1%) was used to calculate the elastic modulus. The data showed that the measured values of elastic modulus of Branched PEU-0% is identical to values published previously, (See, See, Yu, J.; Lin, F.; Lin, P.; Gao, Y.; Becker, M. L. *Macromolecules* 2014, 47, 121, the disclosure of which are incorporated herein by reference in their entirety) and exceeds the published values of clinically available degradable polymers such as PLLA, which is 2.9 GPa (See, Duek, E. A. R.; Zavaglia, C. A. C.; Belangero, W. D. *Polymer* 1999, 40, 6465, the disclosure of which are encorporated herein by reference in their entirety). The branched PEUs possess less mechanical strength compared with linear PEU (Branched PEU-0%) due to the decreased strength of the primary structure formed by inter-segmental Van der Waals forces. It is believed that with increasing amounts of branched monomer, the decreased regularity of the polymer chains by random copolymerization suppresses the amount of crystallinity. The presence of large benzyl groups in the side chains of the branched monomer reduces inter-segmental interactions, which leads to the decreased values of elastic modulus and increased values of elongation at break. The stress-strain curve of Branched PEU-10% showed ductile behavior with a yield point at strain of 6.0% and stress of 37.8 MPa. It is believed that this is likely due to the reduced inter-segmental interactions and enhanced chain networks may lead to the brittle to ductile transition. The elastic modulus of these branched poly(ester urea)s can be tuned by varying the amount of branched monomer.

Water Uptake

The extent of water uptake of polymeric implants is of great importance for applications in biomedicine as water acts as a vehicle for oxygen, nutrition and all the other necessary factors for cells to grow. When polymers are implanted in vivo, they are exposed to an aqueous environment. Absorbed water may influence the mechanical and degradation properties as well as dimensional stability. Defects have the potential of compromising function and stability after implantation. Additionally, water uptake provides a measure of the hydrophilic or hydrophobic nature of these materials and the tendency for hydrolytic degradation. The water-uptake traces and level of water uptake of branched PEUs are shown in FIG. 11A-F and Table 4, respectively.

TABLE 4

Extent of water uptake of the branched poly(ester urea)s with different branch densities.

| Samples | Thickness of the film (nm) | Water Uptake (%) |
|---|---|---|
| PCL | 52 ± 11 | 0.33 ± 0.09 |
| Branched PEU-0% | 41 ± 5 | 1.94 ± 0.07 |
| Branched PEU-1% | 38 ± 5 | 2.06 ± 0.02 |
| Branched PEU-2% | 37 ± 10 | 2.07 ± 0.04 |
| Branched PEU-5% | 46 ± 3 | 2.36 ± 0.07 |
| Branched PEU-8% | 39 ± 4 | 2.73 ± 0.12 |
| Branched PEU-10% | 39 ± 8 | 3.33 ± 0.06 |

Figure 12A:
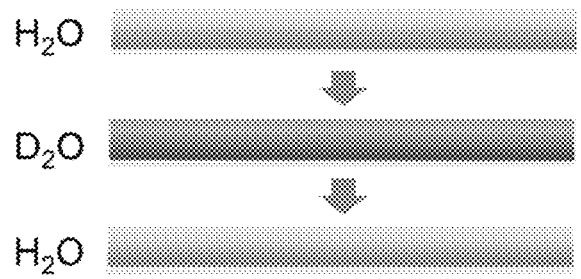
FIG. 12A-B are schematics showing solvent exchange approach the water uptake measurements on bare crystals (FIG. 12A) and the film-coated crystals (FIG. 12B) using a Quartz Crystal Microbalance (QCM).
Figure 12B:
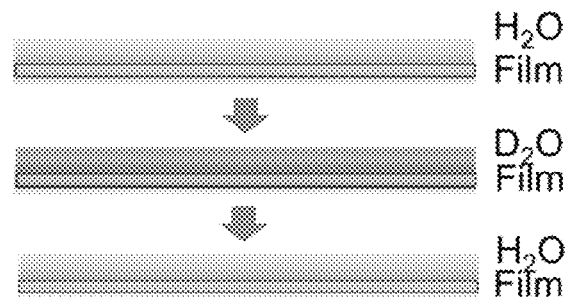
Figure 13:
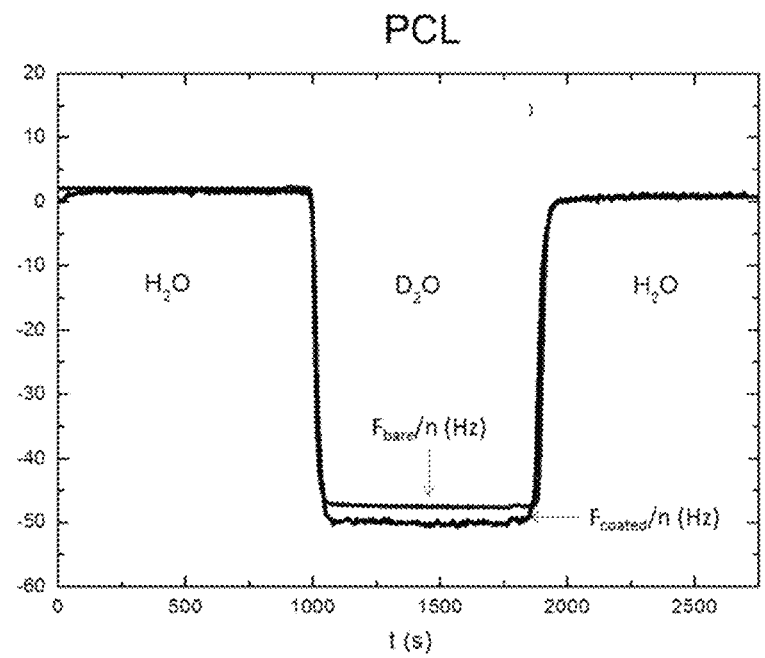
FIG. 13 is a graph showing water uptake data collected using a solvent exchange approach via Quartz Crystal Microbalance (QCM) for Poly(ε-caprolactone) (PCL), which was used as a control. The differences in the scaled frequency changes between the bare crystals and the film-coated crystals were used for the determination of the water content.
Figure 14A:
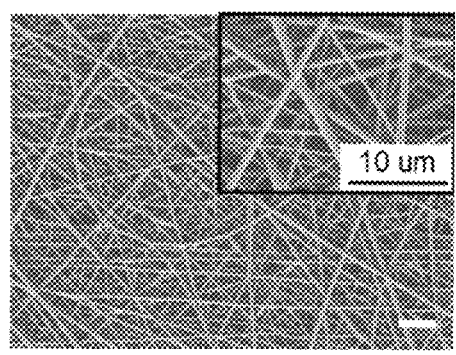
FIG. 14A-D Scanning Electron Microscope (SEM) images of Branched PEU-8% nanofibers (scale bar 10 um) dry at room temperature (FIG. 14A), after soaking in DI water for 60 h at room temperature (FIG. 14B), dry and ETO sterilized at room temperature (FIG. 14C), and ETO sterilized and soaked in DI water at room temperature (FIG. 14D). The SEM images confirmed that the morphology of the fibers did not change after soaking in DI water for 60 h and even after ETO sterilization at room temperature.
Figure 14B:
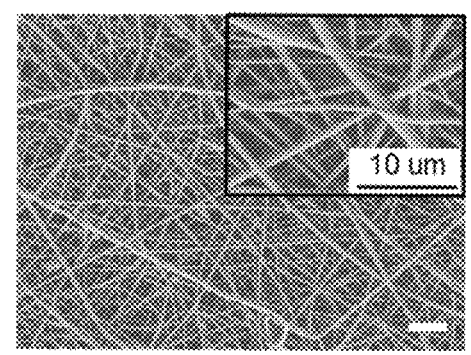
Figure 14C:
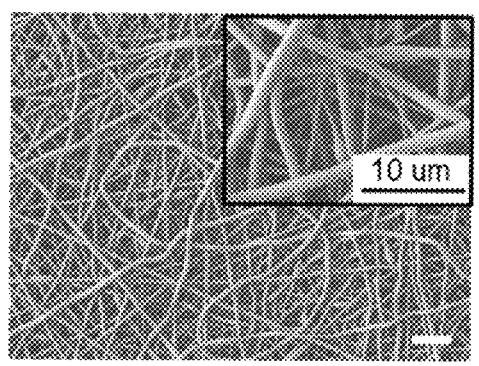
Figure 14D:
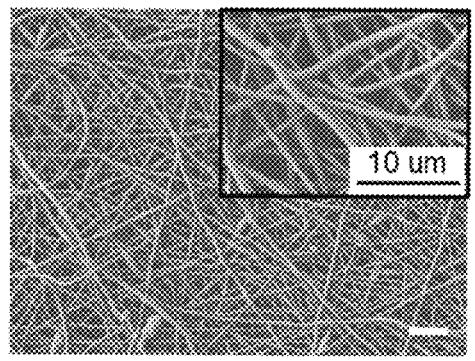
Figure 15A:
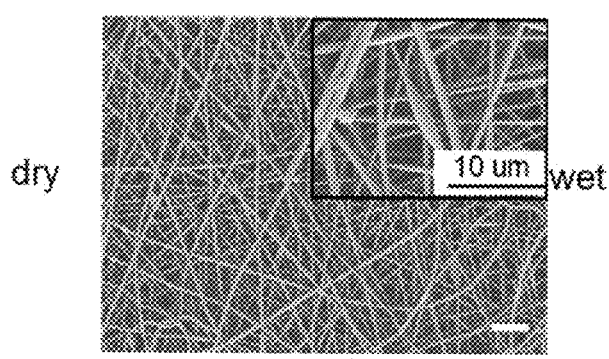
FIG. 15A-D are SEM images of Branched PEU-8% nanofibers (scale bar 10 um) dry at 37° C.
Figure 15B:
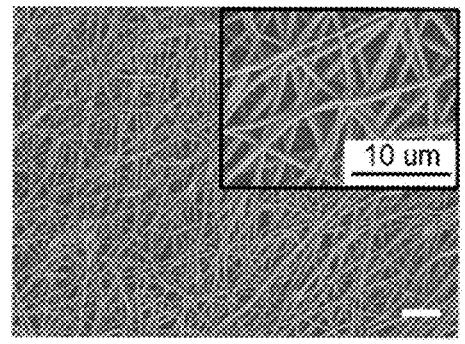
Figure 15C:
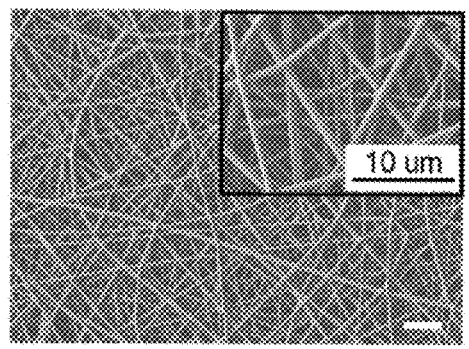
Figure 15D:
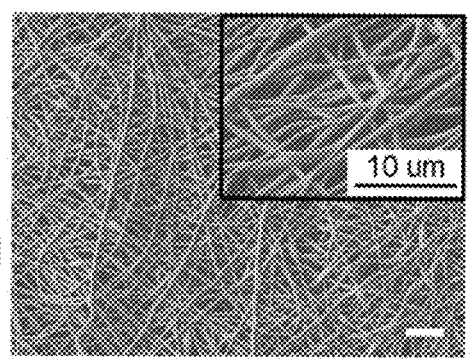
Figure 16A:
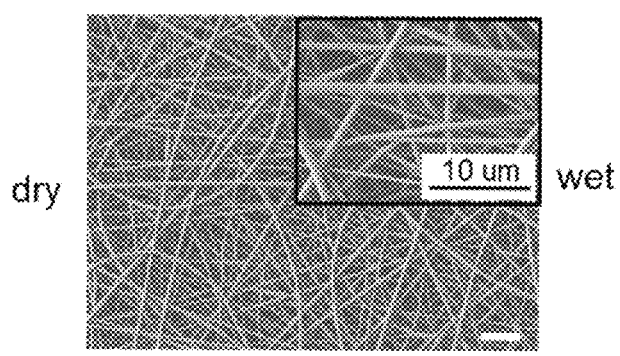
FIG. 16A-D are SEM images of Branched PEU-8% nanofibers (scale bar 10 um) dry at 45° C.
Figure 16B:
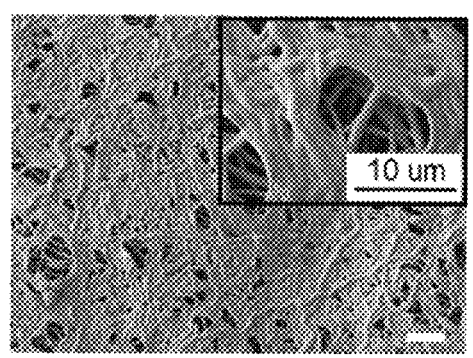
Figure 16C:
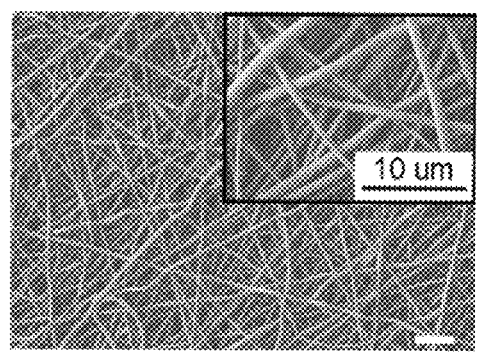
Figure 16D:
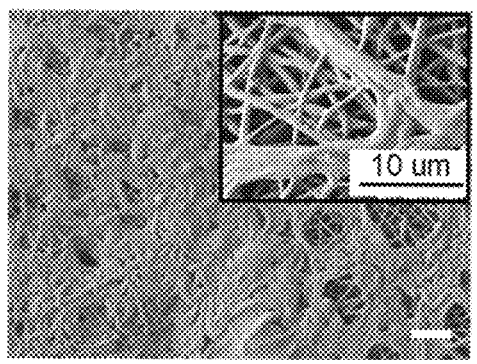

To quantify the extent of water uptake, polymer films were spun coated onto silicon QCM chips and a solvent exchange procedure for both bare sensors and coated sensors was used. (See FIG. 12A-B) The results showed that the extent of water uptake in branched poly(ester urea)s is limited due to the inherent hydrophobicity. The amount of water uptake increased with increasing degree of branching and the time required to achieve the equilibrium water content decreased. As the amount of branched monomer incorporated into the copolymer increases, the density of the urea groups, and associated propensity for the urea groups to interact with water, likewise increase. When compared to the control group PCL for reference (See FIG. 13), which exhibited the lowest equilibrium water uptake (0.33%), each of the PEU polymers tested showed an equilibrium water uptake ranging from approximately 2% to approximately 3% at the end of a 24 h immersion period.

Nanofibers Processing

Nanofibers of Branched PEU-8% were prepared via electrospinning. (See Example 10). The fabrication process was stable and continuous. The SEM images confirmed that the morphology of the fibers did not change after soaking in DI water for 60 h and even after ETO sterilization at room temperature (FIGS. 14A-D). If the incubation temperature was changed to 37° C. for the same period of time (60 h), the morphology stayed the same (FIGS. 15A-D), which is very promising for the materials' biomedical applications. If the incubation temperature was increased to 45° C. and the incubation time became longer (1 week), the fibers stayed as fibers when they were dry, but appeared to swell and stick to each other when soaked in DI water (FIG. 16A-D).

In these experiments, a series of amino acid-based poly(ester urea) copolymers possessing different degree of branching were synthesized by step growth polymerization. This two-step synthetic route provides a straightforward way to obtain branched poly(ester urea)s in high yield and high molecular mass. The resulting chemical structures were confirmed by $^1$H NMR, $^{13}$C NMR, ESI and FTIR. TGA and DSC results showed that the branched PEUs possess high thermal stability and higher glass transition temperatures when introducing branched monomers into the copolymer. The tensile test results showed the values of elastic modulus decrease with increasing the degree of branching. The QCM results showed that the linear poly(ester urea)s exhibit a low extent of water uptake and the extent of water uptake will increase when increasing the degree of branching. The branched PEUs nanofibers are sterilizable with ETO and are stable for long periods of ETO sterilization, elevated temperature and exposure to aqueous environment. It is believed that these enhancements will help to facilitate translation to clinical soft tissue applications.

EXAMPLES

The following examples are offered to more fully illustrate the invention, but are not to be construed as limiting the scope thereof. Further, while some of examples may include conclusions about the way the invention may function, the inventor do not intend to be bound by those conclusions, but put them forth only as possible explanations. Moreover, unless noted by use of past tense, presentation of an example does not imply that an experiment or procedure was, or was not, conducted, or that results were, or were not actually obtained. Efforts have been made to ensure accuracy with respect to numbers used (e.g., amounts, temperature), but some experimental errors and deviations may be present. Unless indicated otherwise, parts are parts by weight, molecular weight is weight average molecular weight, temperature is in degrees Centigrade, and pressure is at or near atmospheric.

Materials

All chemicals and reagents were purchased from Sigma or Fisher Scientific and used as received unless noted otherwise. Chloroform was distilled after drying overnight with calcium hydride.

General Procedures

300 MHz or 500 MHz $^1$H NMR and 75 MHz or 125 MHz $^{13}$C NMR spectra were recorded using a Varian NMR Spectrophotometer. All chemical shifts were reported in ppm (δ), and referenced to the chemical shifts of the residual solvent resonances CH NMR DMSO-$d_6$ 2.50 ppm; $^{13}$C NMR DMSO-$d_6$ 39.50 ppm). The following abbreviations were used to explain the multiplicities: s=singlet, d=doublet, t=triplet, br=broad singlet, m=multiplet. FTIR of all compounds were recorded using MIRACLE 10, Shimadzu Corp. ATR-FTIR spectrometer with 4 cm$^{-1}$ resolution. Electrospray ionization (ESI) was performed using a HCT Ultra II quadrupole ion trap mass spectrometer (Bruker Daltonics, Billerica, Mass.) equipped with an electrospray ionization source. Number-average molecular mass ($M_w$) weight-average molecular mass ($M_n$) and post-precipitation molecular mass distribution ($Đ_M$) were determined by size exclusion chromatography (SEC). The SEC analyses were performed using a TOSOH HLC-8320 gel permeation chromatograph instrument. The experiments were carried out with a flow rate of 1 mL/min using HPLC grade N,N-dimethylformamide (DMF) with 25 mM LiBr as the eluent at 323K with a refractive index (RI) detector and molecular mass values were determined relative to polystyrene standards. The SEC analyses were also performed using a Varian 390-LC-Multi detector suite system equipped with a PLGel 3 µm (50×7.5 mm) guard column, two PLGel 5 µm (300×7.5 mm) mixed-C columns, and a PLAST RT auto-sampler. Detection was conducted using a dual angle light scattering detector (15° and 90°). The analyses were performed in HPLC grade DMF with 5 mM NH$_4$BF$_4$ as the eluent at 323K and at a flow rate of 1.0 mL/min. A single narrow molecular weight poly(methyl methacrylate) standard (73.15 kDa, dn/dc=0.069, IV=0.267) was used to calibrate for absolute molecular weight. The thermal stability of the polymers was measured using thermogravimetric analysis (TGA, TA Q500) across a temperature range of 0° C. to 600° C. at a scanning rate of 20° C. under nitrogen. The thermal characteristics of the polymers were determined using differential scanning calorimetry (DSC, TA Q2000) from 0° C. to 220° C. at a scanning rate of 20° C./min. The resulting values of the thermal properties were determined from three individual measurements. The glass transition temperature was determined from the midpoint in the second heating cycle of DSC.

Example 1

Synthesis of Di-p-Toluene Sulfonic Acid Salts of Bis-L-Phenylalanine-Hexane-1,6-Diester Monomer. (Diol-PHE)

Figure 3:
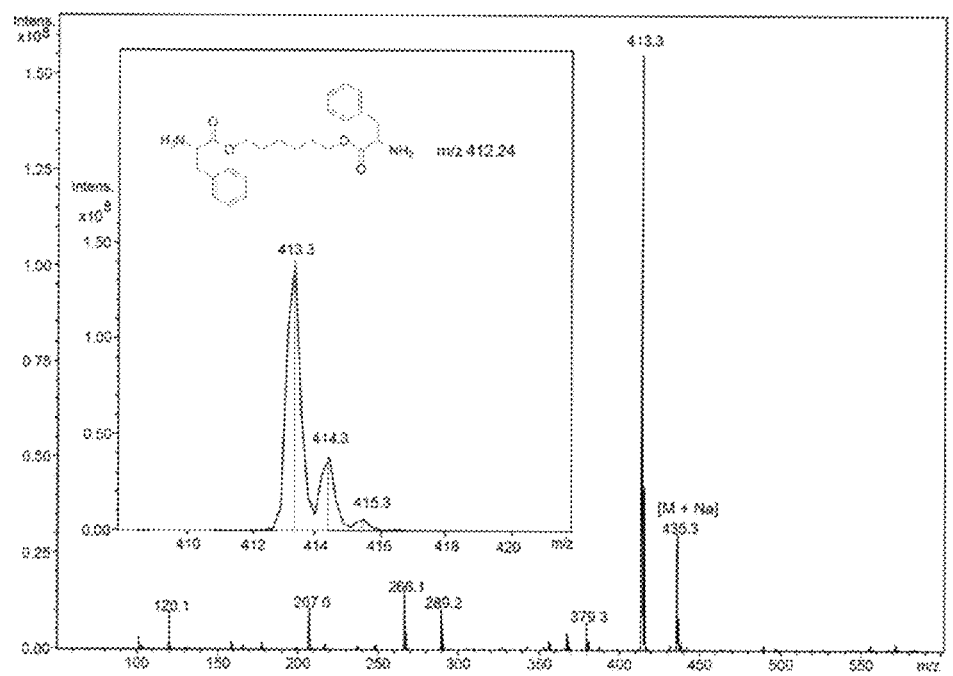
FIG. 3 is a graph reporting Electrospray Ionization Mass Spectrometry (ESI) mass spectroscopy data for di-p-toluene sulfonic acid salts of bis-L-phenylalanine-hexane-1,6-diester monomer (Diol-PHE).
Figure 5:
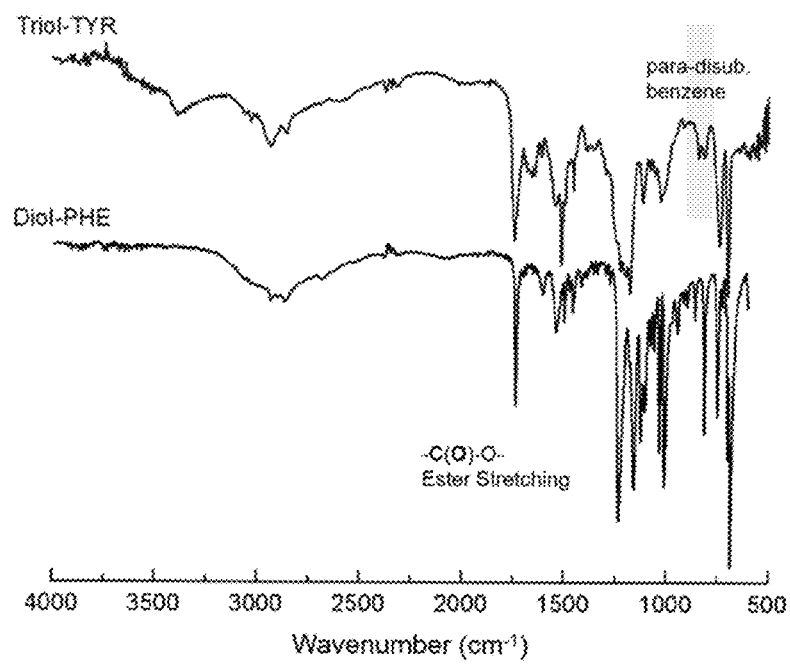
FIG. 5 is a graph reporting FTIR data for di-p-toluene sulfonic acid salts of bis-L-phenylalanine-hexane-1,6-diester monomer (Diol-PHE) and hydrochloric acid salts of tri-O-benzyl-L-tyrosine-1,1,1-trimethyl ethane-triester monomer (Triol-TYR). In the spectra, the peaks at 1735-1750 cm$^{-1}$ are the C=O (ester) stretching peak, which confirmed the formation of the ester bond. The C—H (aromatic) stretching at 3000-3100 cm$^{-1}$, C=C (aromatic) stretching at 1450-1600 cm$^{-1}$ and C—H (aromatic) bending at 750 cm$^{-1}$ prove the existence of aromatic ring in the monomer. The big bands at 1000-1300 cm$^{-1}$ are due to the C—O (ester) stretching and C—H bending. The peaks at 3200-3300 cm$^{-1}$ correspond to the amine NH stretching. This data demonstrate the successful synthesis of each of the monomers.

Di-p-toluene sulfonic acid salts of bis-L-phenylalanine-diol-diester monomers were prepared using previously published procedures, (See, Yu, J.; Lin, F.; Lin, P.; Gao, Y.; Becker, M. L. *Macromolecules* 2014, 47, 121; Lin, F.; Yu, J.; Tang, W.; Zheng, J.; Xie, S.; Becker, M. L. *Macromolecules* 2013, 46, 9515; and Pang, X.; Chu, C.-C. *Biomaterials* 2010, 31, 3745, the disclosure of which are incorporated herein by reference.), and as shown in Scheme 7, below. The $^1$H NMR of the di-p-toluene sulfonic acid salt of bis-L-phenylalanine-hexane-1,6-diester monomer is shown in FIG. 1 and its $^{13}$C NMR spectra, ESI mass spectra and FTIR trace are shown in FIGS. 2A, 3, and 5, respectively.

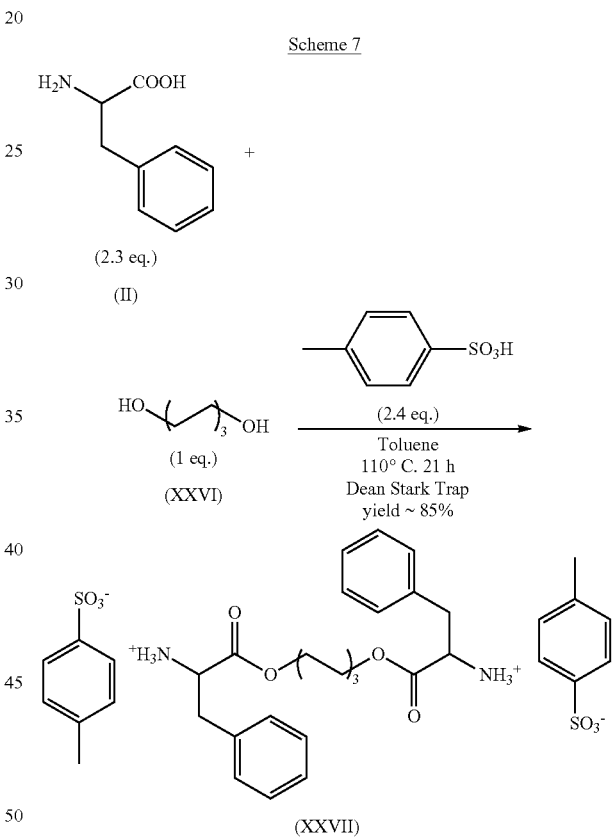

Scheme 7

In brief, 1,6-hexanediol (10.0 g, 90 mmol, 1.0 equiv.), L-phenylalanine (32.2 g, 200 mmol, 2.3 equiv.), p-toluene sulfonic acid monohydrate (38.7 g, 200 mmol, 2.4 equiv.), and toluene (200 mL) were mixed in a 500 mL 2-neck round bottom flask equipped with Dean-Stark trap and a magnetic stir bar. The system was heated to reflux (110° C.) and purged with nitrogen for 20 h. After 20 h, the reaction mixture was cooled to ambient temperature and the product was filtered with diethyl ether. The solid product was dissolved in 3 L of hot water and decolored using activated carbon black (2.0 g) for 2-3 minutes and the decolorized hot liquid obtained by vacuum filtration. When the decolorized hot liquid was cooled to room temperature, the white solid product formed was collected by vacuum filtration. The white solid product was recrystallized 3 times using 3 L of water to yield 57.0 g (yield 85%) of the di-p-toluene sulfonic acid salt of bis-L-phenylalanine-1,6-hexanediol-diester as a white powder. $^1$H NMR (300 MHz, DMSO-$d_6$): 1.04-1.13 (m, 4H, —COOCH$_2$CH$_2$CH$_2$—) 1.38-1.44 (m, 4H, —COOCH$_2$CH$_2$CH$_2$—) 2.27 (s, 6H, CH$_3$Ar—) 2.50 (DMSO) 2.98-3.19 (m, 4H, —CHCH$_2$—Ar—) 3.89-4.03 (m, 4H, —COOCH$_2$CH$_2$—) 4.25-4.32 (m, 2H, $^+$NH$_3$CHCOO—) 7.09-7.13 (d, 4H, aromatic H) 7.21-7.34 (m, 10H, aromatic H) 7.47-7.50 (d, 4H, aromatic H) 8.36 (s, 6H, $^+$NH$_3$—). See, FIG. 1B. $^{13}$C-NMR (75 MHz, DMSO-$d_6$): 20.75, 24.66, 27.62, 35.97, 38.80-40.28 (DMSO-$d_6$), 53.07, 65.46, 125.39, 127.14, 127.95, 128.49, 129.30, 134.69, 137.78, 145.33, 169.03. See, FIG. 2A.

Example 2

Synthesis of Di-p-toluenesulfonic Acid Salt of Bis-L-leucine-octane-1,8-diester 1,8-octanediol (10.00 g, 0.068 mol), L-leucine (20.46 g, 0.156 mol), p-toluenesulfonic acid monohydrate (31.07 g, 0.163 mol) and toluene (200 mL) were mixed in a 500 mL round-bottom flask equipped with Dean-Stark trap and a magnetic stir bar. The system was heated to reflux for 20 h. After the reaction mixture was cooled to ambient temperature, the product was filtered and washed with diethyl ether. The solid product was recrystallized with water for three times to yield 42.9 g (yield 88%) white powder as the product. $^1$H NMR (300 MHz, DMSO-$d_6$): 0.89 (d, J=5.86 Hz, 12H), 1.28 (br. s., 8H), 1.51-1.65 (m, 8H), 1.66-1.78 (m, 2H), 2.29 (s, 6H), 3.98 (t, J=7.03 Hz, 2H), 4.07-4.23 (m, 4H), 7.12 (dd, J=8.49, 0.59 Hz, 4H), 7.42-7.54 (m, 4H), 8.30 (br. s., 6H). $^{13}$C NMR (125 MHz, DMSO-$d_6$): 21.22, 22.37, 22.58, 24.26, 25.58, 28.32, 28.89, 51.09, 66.06, 125.93, 128.51, 138.18, 145.94, 170.38.

Example 3

Synthesis of Di-p-toluenesulfonic Acid Salt of Bis-L-phenylalanine-octane-1,8-diester 1,8-octanediol (10.00 g, 0.068 mol), L-phenylalanine (25.79 g, 0.156 mol), p-toluenesulfonic acid monohydrate (31.07 g, 0.163 mol) and toluene (200 mL) were mixed in a 500 mL round-bottom flask equipped with Dean-Stark trap and a magnetic stir bar. The system was heated to reflux for 20 h. After the reaction mixture was cooled to ambient temperature, the product was filtered and washed with diethyl ether. The solid product was dissolved in 3 L of hot water and decolored using activated carbon black (2.00 g) for 2-3 min. After hot filtration and cooling to room temperature, a white solid product was obtained by vacuum filtration. The product was then recrystallized with water for three times to yield 45.9 g (yield 86%) white powders as product. $^1$H NMR (500 MHz, DMSO-$d_6$): 1.08-1.22 (m, 8H), 1.37-1.49 (m, 4H), 2.29 (s, 6H), 3.02 (dd, J=14.06, 7.95 Hz, 2H), 3.14 (dd, J=13.94, 5.87 Hz, 2H), 3.98-4.08 (m, 4H), 4.28 (dd, J=7.83, 6.11 Hz, 2H), 7.11 (dd, J=8.44, 0.61 Hz, 4H), 7.20-7.36 (m, 10H), 7.48 (d, J=7.83 Hz, 4H), 8.36 (br. s., 6H). $^{13}$C NMR (125 MHz, DMSO-$d_6$): 21.25, 25.49, 28.20, 28.86, 36.65, 53.83, 65.96, 125.99, 127.65, 128.65, 128.97, 129.76, 135.18, 138.56, 145.46, 169.47.

Example 4

Synthesis of Bis-N-Boc-O-benzyl-L-tyrosine-octane-1,8-diester 1,8-octanediol (1.64 g, 11.2 mmol), N-Boc-O-benzyl-L-tyrosine (10.00 g, 26.9 mmol) and DPTS (0.66 g, 2.24 mmol) were dissolved in 60 mL anhydrous dichloromethane under N$_2$. The temperature was lowered to 0° C. with an ice bath after all the solids were dissolved. DIC (4.9 mL, 31.36 mol) was added via syringe in one portion. The reaction was stirred overnight while the temperature gradually increased to room temperature. The mixture was filtered, concentrated and dissolved in CHCl$_3$. The solution was washed with 5% HCl twice, brine once, dried over Na$_2$SO$_4$ and solvent was removed in vaccuo. A light yellow solid (9.31 g, 97%) was obtained with column chromatography on silica gel in MeOH/CHCl$_3$ (5/95, v/v). $^1$H NMR (500 MHz, DMSO-$d_6$): 1.31 (s, 8H), 1.43 (s, 18H), 1.55-1.65 (m, 4H), 2.96-3.10 (m, 4H), 4.03-4.15 (m, 4H), 4.53 (d, J=6.85 Hz, 2H), 4.97 (d, J=7.58 Hz, 2H), 5.04 (s, 4H), 6.87-6.94 (m, 4H), 7.02-7.09 (m, 4H), 7.30-7.46 (m, 10H). $^{13}$C NMR (125 MHz, DMSO-$d_6$): 25.78, 28.32, 28.48, 29.07, 37.57, 54.57, 65.36, 70.02, 114.90, 127.40, 127.93, 128.55, 130.34, 137.03, 157.90.

Example 5

Synthesis of Di-hydrochloric Acid Salt of Bis-O-benzl-L-tyrosine-octane-1,8-diester 80 mL HCl solution (4.0 M in dioxane) was added to 7.60 g (8.91 mmol) Bis-N-Boc-O-benzl-L-tyrosine-octane-1,8-diester and the mixture was stirred overnight under N$_2$. The mixture was concentrated and freeze-dried. The obtained solid was washed three times with diethyl ether to yield a light yellow powder (6.1 g, 94%) as product. $^1$H NMR (500 MHz, DMSO-$d_6$): 1.09-1.24 (m, 8H), 1.35-1.50 (m, 4H), 3.00 (dd, J=13.94, 8.07 Hz, 2H), 3.16 (dd, J=14.06, 5.50 Hz, 2H), 3.99 (t, J=5.22 Hz, 4H), 4.13 (dd, J=7.95, 5.75 Hz, 2H), 5.06 (s, 3H), 6.90-7.01 (m, 4H), 7.15 (d, J=8.56 Hz, 4H), 7.28-7.49 (m, 10H), 8.73 (br. s., 6H). $^{13}$C NMR (125 MHz, DMSO-$d_6$): 25.60, 28.27, 28.96, 35.63, 53.76, 65.68, 66.81, 69.59, 115.23, 127.22, 128.02, 128.27, 128.87, 130.95, 137.50, 158.01, 169.56.

Example 6

Synthesis of Hydrochloric Acid Salts of Tri-O-benzyl-L-tyrosine-1,1,1-trimethyl ethane-triester Monomer. (Triol-TYR)

The branched monomer was synthesized through the esterification between Boc-O-benzyl-L-tyrosine and 1,1,1-tri(hydroxylmethyl)ethane, as shown in Scheme 8.

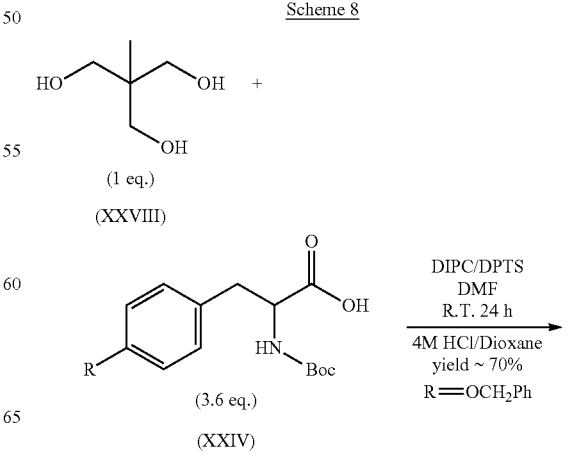

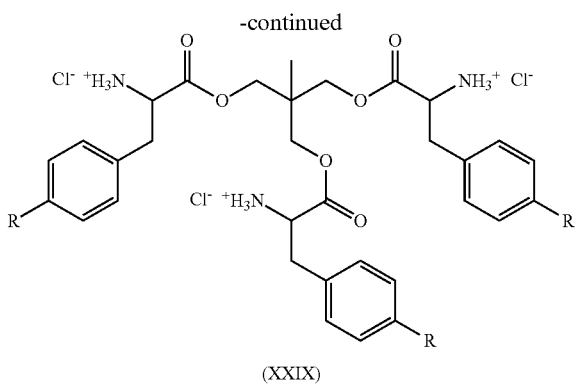

(XXIX)

Figure 4:
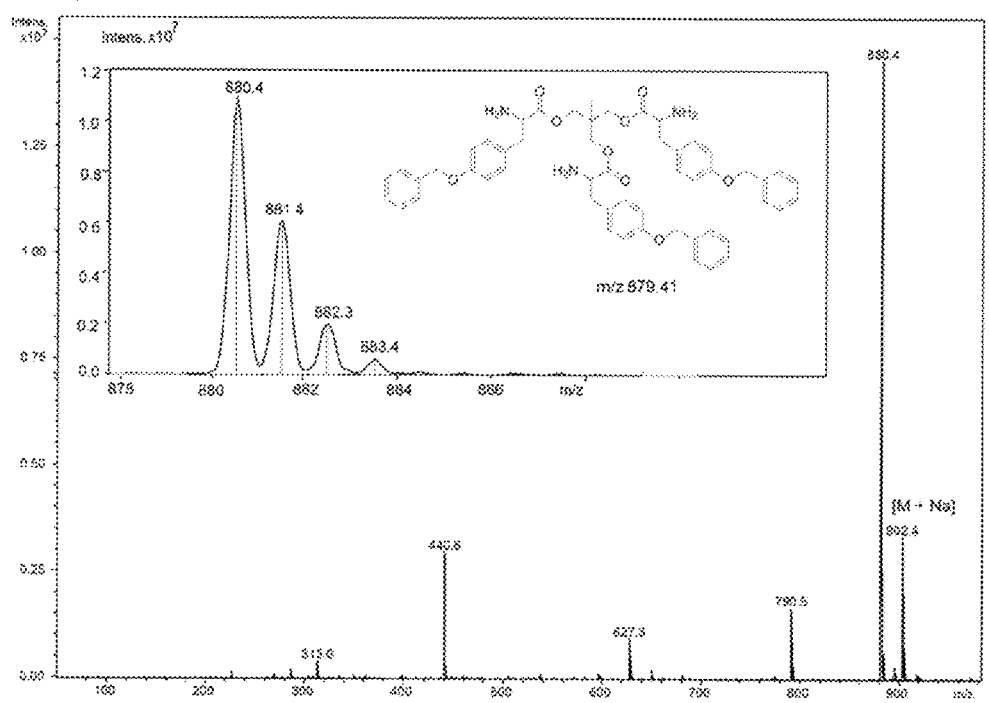
FIG. 4 is a graph reporting ESI mass spectroscopy data for hydrochloric acid salts of tri-O-benzyl-L-tyrosine-1,1,1-trimethyl ethane-triester monomer (Triol-TYR).

The $^1$H NMR of the hydrochloric acid salt of tri-o-benzyl-L-tyrosine-1,1,1-trimethyl ethane-triester monomer (Triol-TYR) is shown in FIG. 1B and its $^{13}$C NMR spectra, ESI mass spectra and FTIR trace are shown in FIGS. 2B, 4 and 5, respectively.

1,1,1-tri(hydroxylmethyl)ethane (1.00 g, 8 mmol, 1.0 equiv.), Boc-O-benzyl-L-tyrosine (11.10 g, 30 mmol, 1.2×3 equiv.) and 4-(N,N-dimethylamino)puridinium-4-toluene-sulfonate (DPTS, 1.50 g, 5 mmol, 0.6 equiv.) were dissolved in a minimum amount of dimethylformamide (DMF). After immersion in an ice bath for 10 min, 1,3-diisopropyl cabodiimide (DPIC, 5.7 mL, 40 mmol, 1.5×3 equiv.) was added via syringe. A light yellow precipitate was observed in minutes. The reaction was allowed to warm up to room temperature, while being continuously stirred for 24 h. After removing the DMF under reduced pressure, the solid was dissolved in chloroform and washed with sodium bicarbonate solution three times. The collected organic solution was concentrated for chromatography purification on silica gel (ethyl acetate/hexane=1:2 v/v). The resulting product was a light yellow solid (8.4 g, yield 72%). $^1$H NMR (500 MHz, DMSO-$d_6$): 0.86 (s, 3H, —CCH$_3$), 1.31 (s, 27H, CH$_3$ in Boc protecting group), 2.50 (DMSO), 2.77-2.93 (d, 6H, —CHCH$_2$—Ar—), 3.92-3.97 (m, 6H, —COOCH$_2$C—), 4.11-4.16 (m, 3H, $^+$NH$_3$CHCOO—), 5.03 (s, 6H, —Ar—OCH$_2$—Ar), 6.89-7.42 (m, 27H, aromatic H).

Boc-protected precursors of the bis diamino monomer precursors were dissolved in HCl/dioxane (4M) and stirred continuously under nitrogen for 12 h. 8.5 g of light yellow solid (yield 70%) was obtained after the solvent was removed by freeze-drying. $^1$H NMR (300 MHz, DMSO-$d_6$): 0.68 (s, 3H, —CCH$_3$), 2.50 (DMSO), 3.02-3.06 (m, 3H, —CHCH$_2$—Ar—), 3.12-3.16 (m, 3H, —CHCH$_2$—Ar—), 3.85-3.97 (d, 6H, —COOCH$_2$C—), 4.22-4.24 (m, 3H, $^+$NH$_3$CHCOO—), 5.03 (s, 6H, —Ar—OCH$_2$—Ar), 6.93-7.43 (m, 27H, aromatic H), 8.72 (s, 9H, $^+$NH$_3$—). See e.g., FIG. 1A. $^{13}$C-NMR (75 MHz, DMSO-$d_6$): 16.45, 35.43, 38.18, 39.68-40.52 (DMSO-$d_6$), 53.90, 66.64-66.81, 69.66, 115.37, 127.34, 128.85-128.89, 130.86, 137.55, 158.03, 168.86. See e.g., FIG. 2B.

Example 7

Synthesis of Branched Poly(Ester Urea)s

Branched poly(ester urea)s according to various embodiments of the present invention were synthesized by interfacial polymerization, as shown in Scheme 9.

Scheme 9

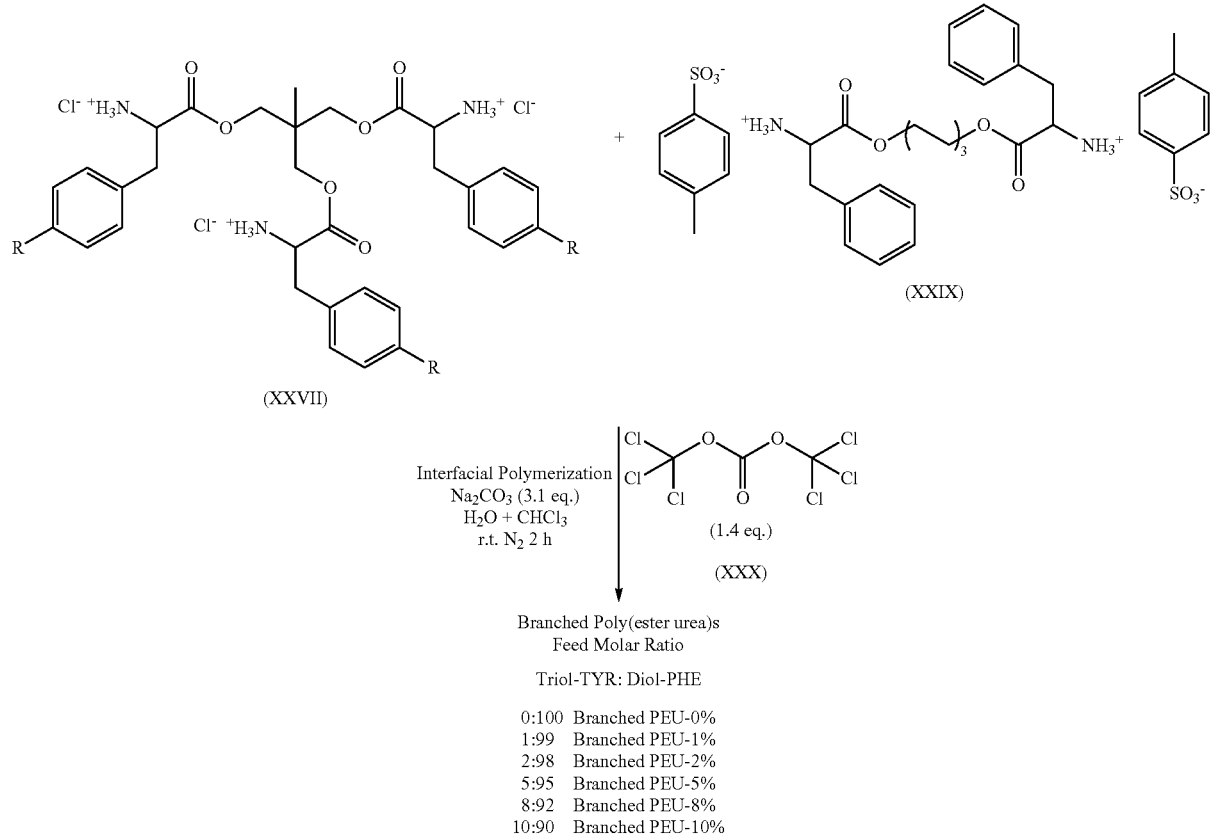

In the embodiment shown in Scheme 9 above, R is —OCH$_2$Ph. In other embodiments, R may be —CH$_3$, —(CH$_2$)$_3$NHC(NH$_2$)C=NH, —CH$_2$CONH$_2$, —CH$_2$COOH, —CH$_2$SH, —(CH$_2$)$_2$COOH, —(CH$_2$)$_2$CONH$_2$, —NH$_2$, —CH$_2$C=CH—N=CH—NH, —CH(CH$_3$)CH$_2$CH$_3$, —CH$_2$CH(CH$_3$)$_2$, —(CH$_2$)$_4$NH$_2$, —(CH$_2$)$_2$SCH$_3$, —CH$_2$Ph, —CH$_2$OH, —CH(OH)CH$_3$, —CH$_2$—C=CH—NH-Ph, —CH$_2$-Ph-OH, or —CH(CH$_3$)$_2$.

In brief, the di-p-toluene sulfonic acid salt of bis-L-phenylalanine-hexane-1,6-diester monomer (Diol-PHE) and hydrochloric acid salts of tri-O-benzyl-L-tyrosine-1,1,1-trimethyl ethane-triester monomer (Triol-TYR) with molar ratio of 100:0, 99:1, 98:2, 95:5, 92:8, 90:10, respectively (1.0 equiv. in total), and sodium carbonate anhydrate (2.1 equiv.) were dissolved in distilled water (0.1M for monomer) in a 2 L 3-neck round bottom flask. The mixture was stirred in a 35° C. water bath for 0.5 h using mechanical stirring. An ice bath was used to cool the system to 0° C. Several minutes later, additional sodium carbonate (1.05 equiv.) was dissolved in distilled water and the solution was transferred into the 2 L 3-neck round bottom flask. When the solution in the flask turned from a cloudy to a clear state, triphosgene (0.35 equiv. to 1.0 equiv. of monomer in total) was dissolved in freshly distilled chloroform (0.6M) and the mixture was added into the 2 L 3-neck round bottom flask through an addition funnel as quickly as possible. The solution in the flask turned white immediately. After 0.5 h, an additional aliquot of triphosgene (0.08 equiv.) was dissolved in freshly distilled chloroform (0.6M) and transferred into the flask dropwise through an addition funnel. The drop rate was approximately 1 drop per second. After 2 h, the solution in the flask was transferred to a separatory funnel. After washing with water, the organic phase was precipitated into hot water. After cooling and drying, the following polymers (yield 90%) were obtained.

Branched PEU-0% (bis-L-phenylalanine-hexane-1,6-diester monomer and tri-O-benzyl-L-tyrosine-1,1,1-trimethyl ethane-triester monomer with molar ratio of 100:0): $^1$H NMR (500 MHz, DMSO-d$_6$): 1.15 (m, 4H, —COOCH$_2$CH$_2$CH$_2$—), 1.43 (m, 4H, —COOCH$_2$CH$_2$CH$_2$—), 2.5 (DMSO), 2.87-2.94 (m, 4H, —CHCH$_2$Ar—), 3.94 (m, 4H, —CHCOOCH$_2$CH$_2$—), 4.34-4.40 (m, 2H, —NHCHCOO—), 6.47-6.5 (m, 2H, —NH—), 7.14-7.17 (m, 4H, aromatic), 7.19-7.28 (d, 6H, aromatic). $^{13}$C NMR (75 MHz, DMSO-d6): 25.33, 28.38, 38.10, 39.40-40.56 (DMSO), 54.49, 64.65, 127.04, 128.78, 129.65, 137.34, 157.07, 172.89.

Branched PEU-1%, Branched PEU-2%, Branched PEU-5%, Branched PEU-8% and Branched PEU-10% possess NMR shifts corresponding to the bis-L-phenylalanine-hexane-1,6-diester monomer units are identical as branched PEU-0%. The chemical shifts of tri-O-benzyl-L-tyrosine-1,1,1-trimethyl ethane-triester monomer units are described below.

Branched PEU-1% (bis-L-phenylalanine-hexane-1,6-diester monomer and tri-O-benzyl-L-tyrosine-1,1,1-trimethyl ethane-triester monomer with molar ratio of 99:1): $^1$H NMR (500 MHz, DMSO-d$_6$): 0.72-0.76 (m, 3H, —CCH$_3$), 4.29 (m, 3H, —NHCHCOO—), 4.99-5.02 (m, 6H, —ArOCH$_2$Ar—), 6.33-6.35 (m, 3H, —NH—), 6.86-7.08 (m, Bzl unit aromatic H), 7.33-7.41 (shoulder, tyrosine unit aromatic H). See, FIG. 6.

Branched PEU-2% (bis-L-phenylalanine-hexane-1,6-diester monomer and tri-O-benzyl-L-tyrosine-1,1,1-trimethyl ethane-triester monomer with molar ratio of 98:2): $^1$H NMR (500 MHz, DMSO-d$_6$): 0.72-0.76 (m, 3H, —CCH$_3$), 4.26-4.29 (m, 3H, —NHCHCOO—), 4.99-5.02 (m, 6H, —ArOCH$_2$Ar—), 6.33-6.35 (m, 3H, —NH—), 6.86-7.08 (m, Bzl unit aromatic H), 7.32-7.42 (shoulder, tyrosine unit aromatic H). See, FIG. 6.

Branched PEU-5% (bis-L-phenylalanine-hexane-1,6-diester monomer and tri-O-benzyl-L-tyrosine-1,1,1-trimethyl ethane-triester monomer with molar ratio of 95:5): $^1$H NMR (500 MHz, DMSO-d$_6$): 0.72-0.76 (m, 3H, —CCH$_3$), 4.29 (m, 3H, —NHCHCOO—), 4.99-5.02 (m, 6H, —ArOCH$_2$Ar—), 6.33-6.35 (m, 3H, —NH—), 6.86-7.08 (m, Bzl unit aromatic H), 7.33-7.42 (shoulder, tyrosine unit aromatic H). See, FIG. 6.

Branched PEU-8% (bis-L-phenylalanine-hexane-1,6-diester monomer and tri-O-benzyl-L-tyrosine-1,1,1-trimethyl ethane-triester monomer with molar ratio of 92:8): $^1$H NMR (500 MHz, DMSO-d$_6$): 0.72-0.76 (m, 3H, —CCH$_3$), 4.28-4.29 (m, 3H, —NHCHCOO—), 4.99-5.02 (m, 6H, —ArOCH$_2$Ar—), 6.33-6.35 (m, 3H, —NH—), 6.86-7.06 (m, Bzl unit aromatic H), 7.38-7.42 (shoulder, tyrosine unit aromatic H). See, FIG. 6.

Branched PEU-10% (bis-L-phenylalanine-hexane-1,6-diester monomer and tri-O-benzyl-L-tyrosine-1,1,1-trimethyl ethane-triester monomer with molar ratio of 90:10): $^1$H NMR (500 MHz, DMSO-d$_6$): 0.72-0.76 (m, 3H, —CCH$_3$), 4.26-4.28 (m, 3H, —NHCHCOO—), 4.99-5.02 (m, 6H, —ArOCH$_2$Ar—), 6.33-6.34 (m, 3H, —NH—), 6.86-7.08 (m, Bzl unit aromatic H), 7.37-7.40 (shoulder, tyrosine unit aromatic H). See, FIG. 6.

Example 8

Mechanical Property Measurements

Thin films of each of the polymers described in Example 7 above were fabricated using a vacuum compression machine (TMP Technical Machine Products Corp.). The machine was preheated to 160° C. Then polymer was added into the 5 cm×5 cm×0.5 mm mold and put into the compression machine with vacuum on. After 30 minutes of melting, the system was degassed three times. Next, 10 lbs*1000, 15 lbs*1000, 20 lbs*1000, 25 lbs*1000 of pressure were applied for 2 minutes respectively. After that, the mold was cooled down with 1000 psi of pressure to prevent the wrinkle on the film's surface. The films were visually inspected to ensure that no bubbles were present in the films. Dumbbell-shaped samples were cut using a custom ASTM Die D-638 Type V.

The elastic modulus of each polymer was obtained using tensile testing by Instron (Instron 5543 Universal Testing Machine) at room temperature (25±1° C.). The gauge length was set as 7.25 mm and the crosshead speed was 3 mm/min. The dimensions of the neck of the specimens were 7.11 mm in length, 1.7 mm in width and 0.6 mm in thickness. The elastic moduli were calculated using the slope of linear fitting of the data from strain of 0% to 0.1%. The results are reported in Table 3, above. The reported results are average values from three individual measurements. See e.g., FIG. 10

Example 9

Water Uptake Measurements

To measure the water uptake characteristics of the polymers described in Example 7 above, quartz crystal microbalance (QCM, Q-sense E4 operator, Biolin Scientific AB, Sweden) was used. When additional mass is added onto the top of the QCM sensor surface, the resonance frequency of the sensor system will decrease proportional to the mass. The mass change of the materials that attach on the sensor can be calculated from this frequency change based on the Sauerbrey relationship if the materials are rigid. The Sauerbrey relationship may be stated as:

$$\Delta m = -C\left(\frac{\Delta f}{n}\right) \quad \text{Equation 1}$$

where $\Delta m$ is the mass change of the materials on the sensor, C is a constant which is 0.177 mg·Hz$^{-1}$·m$^{-2}$, $\Delta f$ is the frequency change, n is the overtone number.

In this experiment, the SiO$_2$-coated crystal sensors X305 (5 MHz resonant frequency) were cleaned following the standard protocols. A solution (2 wt %) of each polymer in DMF was used to spin coat (2000 rpm for 1 min) thin films on QCM crystals. The spun coat films were annealed at 50° C. in the vacuum for 12 h. Poly(ε-caprolactone) was used as a control. To measure the pre-immersion thickness of the film, bare QCM sensors and the same QCM sensors following deposition of a polymer film were exposed to the air and resonance frequencies were recorded. Based on the Sauerbrey relationship, the pre-immersion mass and thickness of the thin film can be calculated based on the frequency shift. The results are the average values for four individual measurements. The pre-immersion thickness values were also confirmed with spectroscopic ellipsometry. After measuring the thickness of the films, a solvent exchange approach (See Aulin, C.; Ahola, S.; Josefsson, P.; Nishino, T.; Hirose, Y.; Österberg, M.; Wågberg, L. Langmuir 2009, 25, 7675, the disclosure of which is incorporated herein by reference in its entirety) was carried out to test uptake of water into the polymers. The results are shown in Table 4, above. The reported results were the average values of four individual measurements. The reported data correspond to the normalized frequency of the seventh overtone. See, e.g., FIG. 11A-F.

Example 10

Nanofiber Fabrication Via Electrospinning

Branched PEU-8% was dissolved in hexafluoroisopropanol (HFIP) (6 wt %). A voltage of 12 kV was used and an aluminum foil collector was grounded 15 cm away from the 25 gauge needle. The nanofiber mats were dried in vacuum to remove the residual solvent. The nanofibers were incubated dry at room temperature, dry at 37° C., dry at 45° C., soaked in DI water at room temperature for 60 h, soaked in DI water at 37° C. for 60 h, and soaked in DI water at 45° C. for 1 week. The morphology of the nanofibers was characterized using field-emission scanning electron microscopy (SEM) (JSM-7401F, JEOL, Peabody, Mass.). The acceleration voltage for the SEM imaging was 5.00 kV. Ethylene oxide (EtO) gas treatment was performed using a standard EtO 24 h cycle sterilization apparatus (Andersen Sterilizers, Inc. AN 74i anprolene gas sterilizer). The morphology of the nanofibers after sterilization was also confirmed by SEM. See e.g., FIGS. 14-A-D, 15A-D, and 16A-D. All samples were vacuum dried at room temperature and sputter coated with silver prior to scanning.

In light of the foregoing, it should be appreciated that the present invention significantly advances the art by providing a hyperbranched amino acid based PEU polymer (and related methods) that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A hyperbranched amino acid-based poly(ester urea) comprising:
    a plurality of first segments containing a linear amino acid-based diester monomer residue, said linear amino acid-based diester monomer residue comprising two or more amino acid residues; and
    a plurality of second segments containing a branched amino acid-based polyester monomer residue, said branched amino acid-based polyester monomer residue comprising three or more amino acid residues;
    wherein said hyperbranched amino acid-based poly(ester urea) has a polydispersity index (Dm) from about 1.5 to about 10.0.

2. The hyperbranched amino acid-based poly(ester urea) of claim 1 wherein, said linear amino acid-based diester monomer residue comprises two amino acid residues separated by from about 2 to about 20 carbon atoms.

3. The hyperbranched amino acid-based poly(ester urea) of claim 1 wherein, said two or more amino acid residues are residues of phenylalanine, alanine, arginine, asparagine, aspartate, cysteine, glutamic acid, glutamine, glycine, proline, serine, tyrosine; isoleucine, leucine, lysine, methionine, phenylalanine, threonine, tryptophan and valine or combinations thereof.

4. The hyperbranched amino acid-based poly(ester urea) of claim 1 wherein, said branched amino acid-based polyester monomer residue further comprises three or more amino acid residues separated from each other by from about 2 to about 60 carbon atoms.

5. The hyperbranched amino acid-based poly(ester urea) of claim 1 wherein, the branched amino acid-based polyester monomer residue are from about 0.5 mole percent to about 20 mole percent of said hyperbranched amino acid-based poly(ester urea).

6. The hyperbranched amino acid-based poly(ester urea) of claim 1 having a weight average molecular weight (Mw) of from about 10,000 to about 1,000,000.

7. The hyperbranched amino acid-based poly(ester urea) of claim 1 having a number average molecular weight (Mn) of from about 5,000 to about 500,000.

8. The hyperbranched amino acid-based poly(ester urea) of claim 1 having a glass transition temperature ($T_g$) of from about 40° C. to about 70° C.

9. The hyperbranched amino acid-based poly(ester urea) of claim 1 having an onset degradation temperature (Td) of from about 270° C. to about 320° C.

10. The hyperbranched amino acid-based poly(ester urea) of claim 1 having an elastic modulus of from about 1.5 GPa to about 5.0 GPa at room temperature.

11. The hyperbranched amino acid-based poly(ester urea) of claim 1 having improved hydrolytic stability when compared to a corresponding PEU polymer that does not contain said plurality of second segments.

12. A fiber comprising the hyperbranched amino acid-based poly(ester urea) of claim 1.

13. The fiber of claim 12 wherein said fiber is formed by a process selected from the group consisting of electrospinning, melt blowing, blow spinning, centrifugal spinning, Rotary Jet Spinning (RJS), Gas Jet Fibers (GJF), Nanofibers by Gas Jet (NGJ), three-dimensional printing, extrusion, and combinations thereof.

14. The fiber of claim 12 wherein said fiber is formed by electrospinning.

15. The fiber of claim 12 wherein said fiber is a nonofiber or microfiber.

16. The fiber of claim 12, wherein said fiber can be sterilized using ethyloxide (ETO) sterilization without significant degradation or loss of function.

* * * * *